(12) United States Patent
Takahashi

(10) Patent No.: US 11,335,958 B2
(45) Date of Patent: May 17, 2022

(54) BATTERY, BATTERY PACK, ELECTRONIC APPARATUS, ELECTRIC VEHICLE, POWER STORAGE DEVICE AND POWER SYSTEM

(71) Applicant: MURATA MANUFACTURING CO., LTD., Kyoto (JP)

(72) Inventor: Hidetoshi Takahashi, Kyoto (JP)

(73) Assignee: Murata Manufacturing Co., Ltd., Kyoto (JP)

(*) Notice: Subject to any disclaimer, the term of this patent is extended or adjusted under 35 U.S.C. 154(b) by 5 days.

(21) Appl. No.: 16/794,495

(22) Filed: Feb. 19, 2020

(65) Prior Publication Data

US 2020/0185783 A1    Jun. 11, 2020

Related U.S. Application Data

(63) Continuation of application No. PCT/JP2018/030680, filed on Aug. 20, 2018.

(30) Foreign Application Priority Data

Aug. 21, 2017 (JP) .............................. JP2017-158829

(51) Int. Cl.
*H01M 6/10* (2006.01)
*H01M 10/0587* (2010.01)
*B60L 50/64* (2019.01)
(Continued)

(52) U.S. Cl.
CPC ......... *H01M 10/0587* (2013.01); *B60L 50/64* (2019.02); *H01M 10/0459* (2013.01);
(Continued)

(58) Field of Classification Search
CPC ......... H01M 10/0587; H01M 10/0585; H01M 10/0459; H01M 10/045; H01M 10/425;
(Continued)

(56) References Cited

U.S. PATENT DOCUMENTS

2011/0217577 A1    9/2011  Fukui et al.
2017/0018808 A1*   1/2017  Takanashi ............. H01M 4/525
(Continued)

FOREIGN PATENT DOCUMENTS

CN    102299294 A    12/2011
JP    2000223108 A   8/2000
(Continued)

OTHER PUBLICATIONS

International Search Report for Application No. PCT/JP2018/030680, dated Sep. 18, 2018.
(Continued)

*Primary Examiner* — Raymond Alejandro
(74) *Attorney, Agent, or Firm* — K&L Gates LLP

(57) ABSTRACT

A battery includes an electrode body having a positive electrode and a negative electrode, in which the positive electrode and the negative electrode are wound; and an exterior material that accommodates the electrode body, in which at least one of the positive electrode and the negative electrode is divided into two or more electrodes adjacent in a winding direction, the two or more of electrodes each have a current collecting lead, and the current collecting leads are electrically connected to each other at a position outside the exterior material.

19 Claims, 12 Drawing Sheets

(51) Int. Cl.
　　*H01M 10/04* (2006.01)
　　*H01M 10/42* (2006.01)
　　*H01M 10/44* (2006.01)

(52) U.S. Cl.
　　CPC ......... *H01M 10/425* (2013.01); *H01M 10/44* (2013.01); *H01M 2010/4278* (2013.01); *H01M 2220/20* (2013.01)

(58) Field of Classification Search
　　CPC ......... H01M 10/44; H01M 2010/4278; H01M 2220/20; B60L 50/64
　　See application file for complete search history.

(56) References Cited

U.S. PATENT DOCUMENTS

2018/0191034 A1* 7/2018 Zeng ................ H01M 10/0587
2018/0287215 A1 10/2018 Matsui et al.

FOREIGN PATENT DOCUMENTS

| JP | 2001202946 A | 7/2001 |
| JP | 2002-305029 | 10/2002 |
| JP | 2006277990 A | 10/2006 |
| JP | 2008262777 A | 10/2008 |
| JP | 2009176582 A | 8/2009 |
| JP | 2009272161 A | 11/2009 |
| JP | 2011120990 A | 6/2011 |
| JP | 2011204660 A | 10/2011 |
| JP | 2014167890 A | 9/2014 |
| WO | 2017104117 A1 | 6/2017 |

OTHER PUBLICATIONS

Japanese Office Action dated Mar. 30, 2021 in corresponding Japanese Application No. 2019-5337620.

* cited by examiner

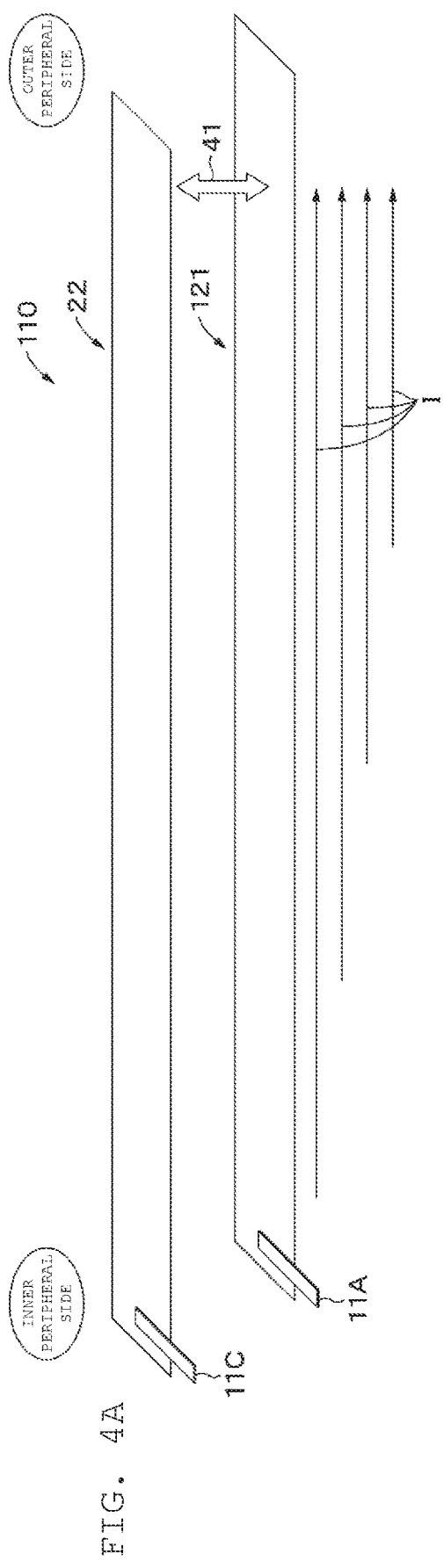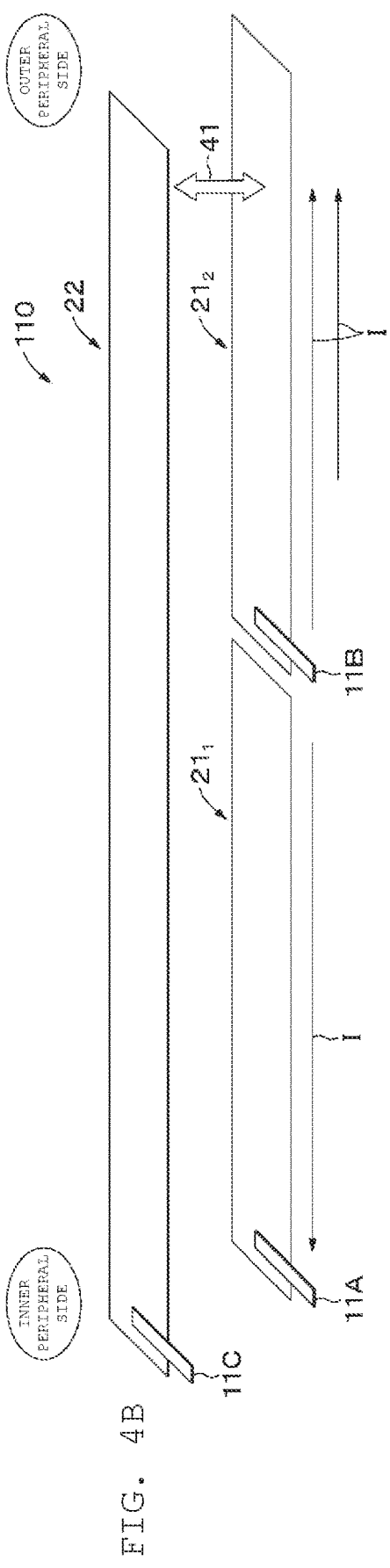

BATTERY, BATTERY PACK, ELECTRONIC APPARATUS, ELECTRIC VEHICLE, POWER STORAGE DEVICE AND POWER SYSTEM

CROSS REFERENCE TO RELATED APPLICATIONS

The present application is a continuation of PCT patent application no. PCT/JP2018/030680, filed on Aug. 20, 2018, which claims priority to Japanese patent application no. JP2017-158829 filed on Aug. 21, 2017, the entire contents of which are being incorporated herein by reference.

BACKGROUND

The present disclosure generally relates to a battery, a battery pack, an electronic apparatus, an electric vehicle, a power storage device and a power system.

A battery having a wound structure in which belt-like positive and negative electrodes are wound is widely used. With regard to the battery having the wound structure, studies have been made on batteries having various configurations in order to improve battery characteristics.

SUMMARY

The present disclosure generally relates to a battery, a battery pack, an electronic apparatus, an electric vehicle, a power storage device and a power system.

An object of the present disclosure is to provide a battery capable of improving safety when a short circuit due to an external scratch or the like occurs near a surface layer of a battery, a battery pack, an electronic apparatus, an electric vehicle, a power storage device and a power system including the battery.

According to an embodiment of the present disclosure, a battery is provided. The battery includes an electrode body having a positive electrode and a negative electrode, in which the positive electrode and the negative electrode are wound; and an exterior material configured to accommodate the electrode body, in which at least one of the positive electrode and the negative electrode is divided into two or more electrodes adjacent in a winding direction, the two or more of electrodes each have a current collecting lead, and the current collecting leads are electrically connected to each other at a position outside the exterior material.

A battery pack, an electronic apparatus, an electric vehicle, a power storage device, and a power system of the present disclosure include the battery as described herein.

According to an embodiment of the present disclosure, it is possible to improve safety when a short circuit occurs due to an external scratch or the like near a surface layer of a battery.

It should be understood that the effect described here is not necessarily limited, and may be any of the effects described in the present disclosure or an effect different from them.

BRIEF DESCRIPTION OF FIGURES

FIG. 4A is a schematic diagram for describing how a short-circuit current flows in a battery whose positive electrode is not divided. FIG. 4B is a schematic diagram for describing how a short-circuit current flows in an electrode in which the positive electrode is divided according an embodiment of the present disclosure.

DETAILED DESCRIPTION

Figure 1A:
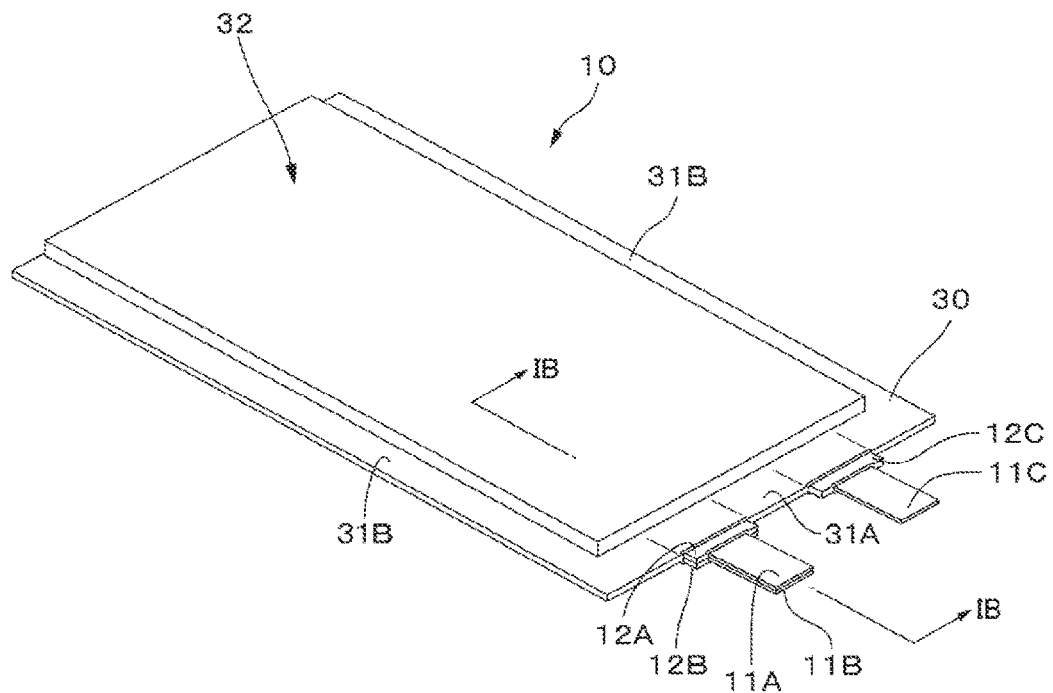
FIG. 1A is a perspective view showing an example of an appearance of a battery according to an embodiment of the present disclosure.
Figure 2:
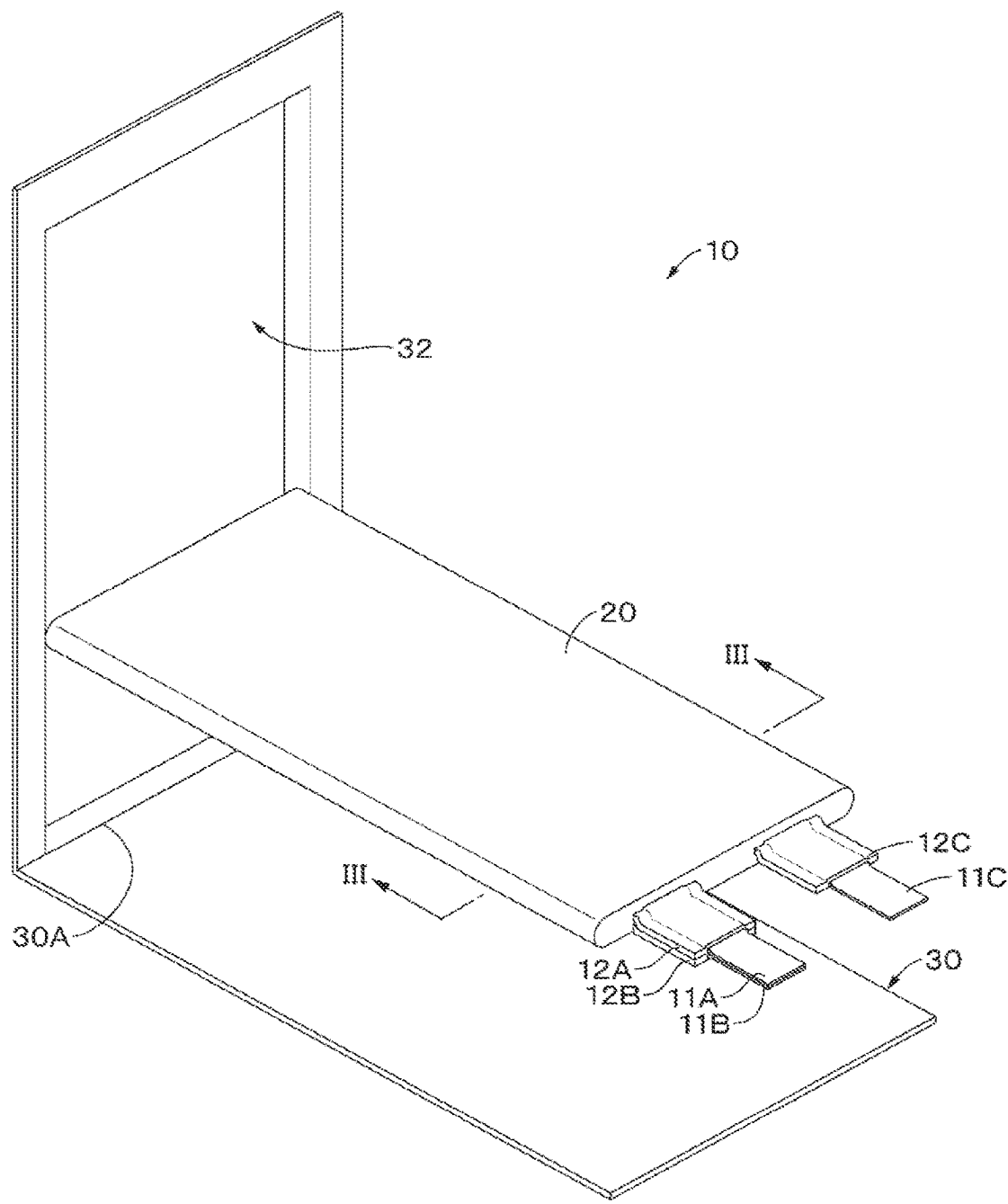
FIG. 2 is an exploded perspective view showing an example of a configuration of the battery according to an embodiment of the present disclosure.

As described herein, the present disclosure will be described based on examples with reference to the drawings, but the present disclosure is not to be considered limited to the examples, and various numerical values and materials in the examples are considered by way of example A non-aqueous electrolyte secondary battery (hereinafter simply referred to as "battery") 10 according to the first embodiment is a so-called laminate film type lithium ion secondary battery as shown in FIGS. 1A and 2, and includes a flat electrode body 20 to which positive electrode leads (current collecting leads) 11A and 11B and a negative electrode lead (current collecting lead) 11C are attached, an electrolytic solution (not shown), and a film-like exterior material 30 accommodating the electrode body 20 and the electrolytic solution. When the battery 10 is viewed in a plan view from a direction perpendicular to its main surface, the battery 10 has a rectangular shape.

The positive electrode leads 11A and 11B and the negative electrode lead 11C are led out from one short side of the battery 10 in the same direction. The positive electrode leads 11A and 11B are provided so as to overlap in a thickness direction of the electrode body 20, and are electrically connected outside the exterior material 30. Hereinafter, the short side of the electrode body 20 from which the positive electrode leads 11A and 11B and the negative electrode lead 11C are led out is referred to as a top side, and the opposite short side is referred to as a bottom side. In addition, the long side of the battery 10 is referred to as a side.

The positive electrode leads 11A and 11B and the negative electrode lead 11C have, for example, a thin plate shape or a mesh shape. The positive electrode leads 11A and 11B and the negative electrode lead 11C are made of, for example, a metal material such as aluminum (Al), copper (Cu), nickel (Ni), or stainless steel.

Figure 1B:
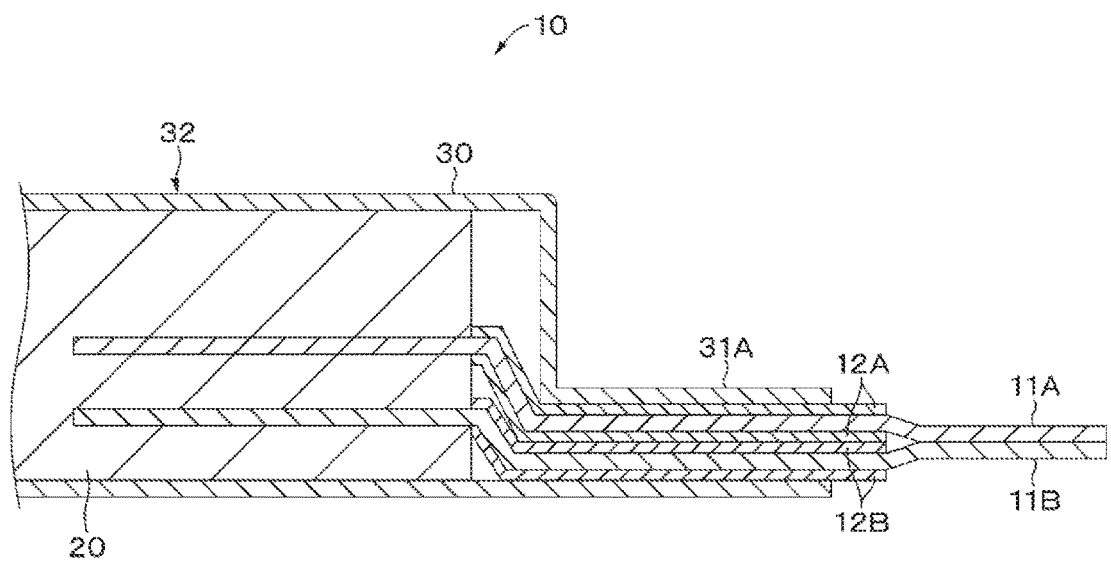
FIG. 1B is a cross-sectional view taken along line IB-IB of FIG. 1A.

As shown in FIGS. 1A, 1B and 2, the positive electrode leads 11A and 11B are covered with sealants 12A and 12B for suppressing entry of outside air, respectively. More specifically, the sealants 12A and 12B are provided between the positive electrode lead 11A and the exterior material 30, and between the positive electrode lead 11B and the exterior material 30, respectively, and the sealants 12A and 12B are provided between the positive electrode leads 11A and 11B. Note that only one of the sealants 12A and 12B may be provided between the positive electrode leads 11A and 11B.

The sealants 12A and 12B cover the range from the portion of the positive electrode leads 11A and 11B located at or near the top end of the electrode body 20 to the portion sandwiched by the exterior material 30. That is, the sealants 12A and 12B not only suppress the entry of the outside air, but also hold the positive electrode leads 11A and 11B so as not to be in electrical contact with each other on the inner side and the peripheral portion of the exterior material 30.

As shown in FIGS. 1A, 1B, and 2, the negative electrode lead 11C is covered with a sealant 12C for suppressing entry of outside air. More specifically, the sealant 12C is provided between the negative electrode lead 11C and the exterior material 30.

The sealants 12A, 12B, and 12C are made of an insulating material having adhesion to the positive electrode leads 11A, 11B and the negative electrode lead 11C, for example, a polyolefin resin such as polyethylene, polypropylene, modified polyethylene or modified polypropylene.

The exterior material 30 has a rectangular shape and is folded back so that each side overlaps from a central portion 30A in a longitudinal direction of the exterior material 30. A notch or the like may be provided in advance in the central portion 30A serving as a folded portion. The electrode body 20 is sandwiched between the folded exterior material 30. A seal portion 31A is formed on the top side of the periphery of the folded exterior material 30, and seal portions 31B are formed on both sides. The exterior material 30 has an accommodating portion 32 for accommodating the electrode body 20 on one surface to be overlapped. The accommodating portion 32 is formed by, for example, deep drawing.

The exterior material 30 is made of, for example, a rectangular laminate film having flexibility. The exterior material 30 includes a metal layer, a first resin layer provided on one surface (first surface) of the metal layer, and a second resin layer provided on the other surface (second surface) of the metal layer. The exterior material 30 may further include an adhesive layer on at least one of between the metal layer and the first resin layer and between the metal layer and the second resin layer, if necessary. Note that, the surface on the first resin layer side of both surfaces of the exterior material 30 becomes an outer surface, and the surface on the second resin layer side thereof becomes an inner surface for accommodating the electrode body 20.

The metal layer is a barrier layer that plays a role of suppressing entry of moisture and the like and protecting the electrode body 20 that is a storage item. The metal layer is a metal foil and contains, for example, aluminum or an aluminum alloy.

The first resin layer is a surface protection layer having a function of protecting the surface of the exterior material 30. The first resin layer contains, for example, at least one of nylon (Ny), polyethylene terephthalate (PET) and polyethylene naphthalate (PEN).

The second resin layer is a heat-sealing resin layer for sealing the edges of the inner surface of the folded exterior material 30 by heat-sealing. The second resin layer contains, for example, at least one of polypropylene (PP) and polyethylene (PE).

It should be understood that the exterior material 30 may include a laminate film having another structure, a polymer film such as polypropylene, or a metal film instead of the above-described laminate film. Alternatively, it may be made of a laminate film in which a polymer film is laminated on one or both sides of an aluminum film as a core material.

In addition, the exterior material 30 may further include a colored layer, or may include a coloring material in at least one of the first and second resin layer, in terms of beauty of the appearance. When the exterior material 30 further includes an adhesive layer on at least one of between the metal layer and the first resin layer and between the metal layer and the second resin layer, the adhesive layer may include a coloring material.

Figure 3:
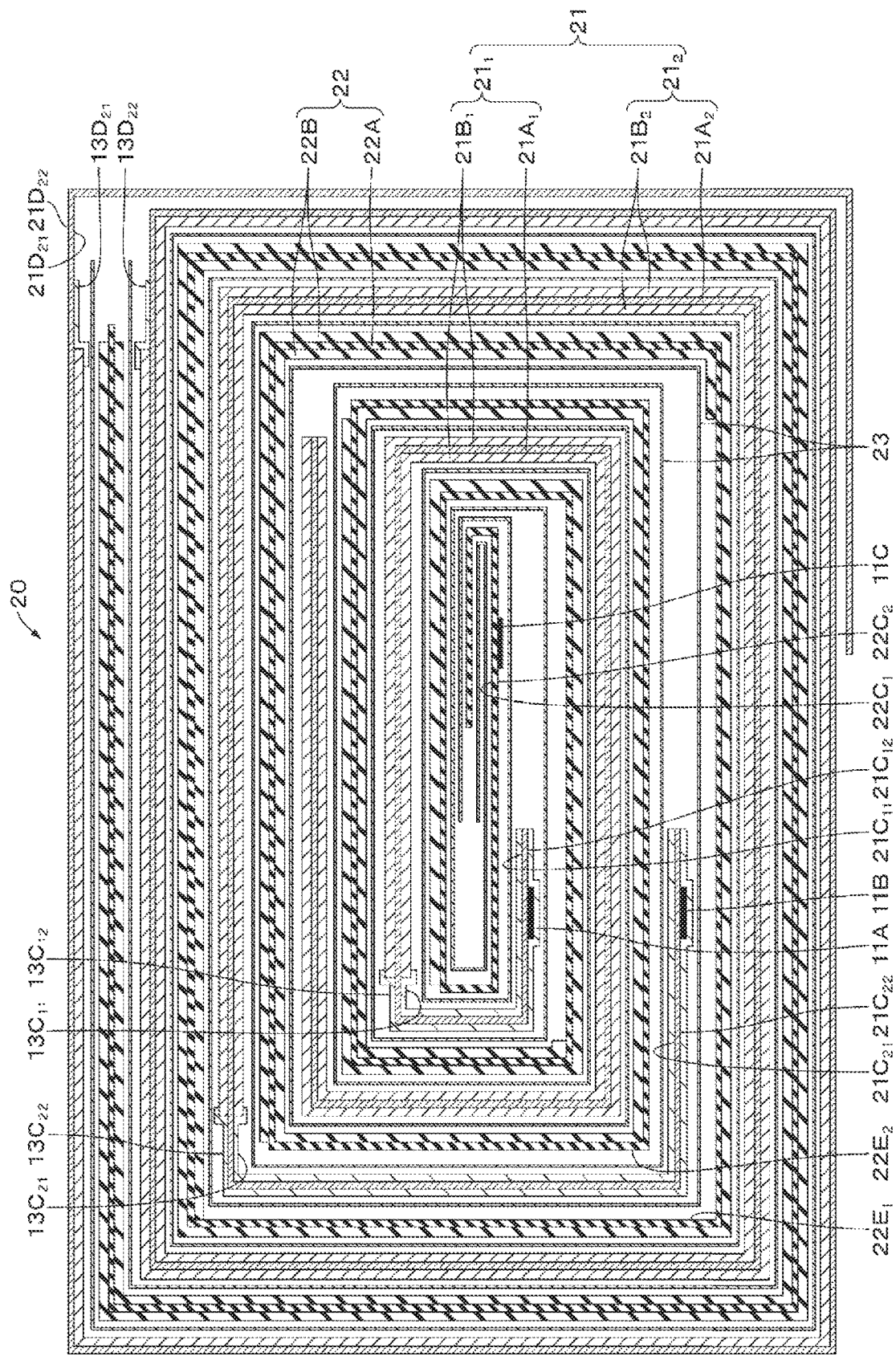
FIG. 3 is a cross-sectional view taken along line III-III of FIG. 2.

As shown in FIG. 3, the electrode body 20 is of a wound type, and has a configuration in which a long positive electrode 21 and a long negative electrode 22 are laminated with a long separator 23 interposed therebetween and are wound in a flat and spiral shape, and the outermost peripheral portion is protected by a protective tape (not shown). An electrolytic solution serving as an electrolyte is injected into the interior of the exterior material 30, and is impregnated in the positive electrode 21, the negative electrode 22, and the separator 23.

Hereinafter, the positive electrode 21, the negative electrode 22, the separator 23, and the electrolytic solution configuring the battery 10 will be sequentially described.

The positive electrode 21 is divided into first and second positive electrodes $21_1$ and $21_2$ adjacent in the winding direction. Of the first and second positive electrodes $21_1$ and $21_2$, the first positive electrode $21_1$ is located on the inside, and the second positive electrode $21_2$ is located on the outside.

The first positive electrode $21_1$ includes a positive electrode current collector $21A_1$, and positive electrode active material layers $21B_1$ provided on both surfaces of the positive electrode current collector $21A_1$. The second positive electrode $21_2$ includes a positive electrode current collector $21A_2$, and positive electrode active material layers $21B_2$ provided on both surfaces of the positive electrode current collector $21A_2$. The positive electrode current collectors $21A_1$ and $21A_2$ are made of a metal foil such as an aluminum foil, a nickel foil, a stainless steel foil, or the like. The positive electrode active material layers $21B_1$ and $21B_2$ include, for example, a positive electrode active material capable of occluding and releasing lithium as an electrode reactant, and a binder. The positive electrode active material layers $21B_1$ and $21B_2$ may further include a conductive agent as needed.

The positive electrode active material layer $21B_1$ is not provided on the inner surface of the end portion on the inner peripheral side of the first positive electrode $21_1$, and a positive electrode current collector exposed portion $21C_{11}$ in which the inner surface of the positive electrode current collector $21A_1$ is exposed is provided. The positive electrode active material layer $21B_1$ is not provided on the outer surface of the end portion on the inner peripheral side of the first positive electrode $21_1$, and a positive electrode current collector exposed portion $21C_{12}$ in which the outer surface of the positive electrode current collector $21A_1$ is exposed is provided. The positive electrode lead 11A is connected to the positive electrode current collector exposed portion $21C_{12}$.

The lengths of the positive electrode current collector exposed portions $21C_{11}$ and $C_{12}$ in the winding direction are substantially the same.

The positive electrode current collector exposed portion $21C_{11}$ and a step portion at the boundary between the positive electrode current collector exposed portion $21C_{11}$ and the positive electrode active material layer $21B_1$ are covered with a protective tape $13C_{11}$.

The positive electrode current collector exposed portion $21C_{12}$ and a step portion at the boundary between the positive electrode current collector exposed portion $21C_{12}$ and the positive electrode active material layer $21B_1$ are covered with a protective tape $13C_{12}$. Note that the positive electrode lead 11A is also covered with the protective tape $13C_{12}$ together with the positive electrode current collector exposed portion $21C_{12}$.

The positive electrode active material layer $21B_1$ is provided on the inner and outer surfaces of the end portion on the outer peripheral side of the first positive electrode $21_1$, and the inner and outer surfaces of the positive electrode current collector $21A_1$ are not exposed.

The positive electrode active material layer $21B_2$ is not provided on the inner surface of the end portion on the inner peripheral side of the second positive electrode $21_2$, and a positive electrode current collector exposed portion $21C_{21}$ in which the inner surface of the positive electrode current collector $21A_2$ is exposed is provided. The positive electrode active material layer $21B_2$ is not provided on the outer surface of the end portion on the inner peripheral side of the second positive electrode $21_2$, and a positive electrode current collector exposed portion $21C_{22}$ in which the outer surface of the positive electrode current collector $21A_2$ is exposed is provided. The positive electrode lead 11B is connected to the positive electrode current collector exposed portion $21C_{22}$. The lengths of the positive electrode current collector exposed portions $21C_{21}$ and $C_{22}$ in the winding direction are substantially the same.

The positive electrode current collector exposed portion $21C_{21}$ and a step portion located at the boundary between the positive electrode current collector exposed portion $21C_{21}$ and the positive electrode active material layer $21B_2$ are covered with a protective tape $13C_{21}$. The positive electrode current collector exposed portion $21C_{22}$ and a step portion located at the boundary between the positive electrode current collector exposed portion $21C_{22}$ and the positive electrode active material layer $21B_2$ are covered with a protective tape $13C_{22}$. Note that the positive electrode lead 11B is also covered with the protective tape $13C_{22}$ together with the positive electrode current collector exposed portion $21C_{22}$.

The positive electrode active material layer $21B_2$ is not provided on the inner surface of the end portion on the outer peripheral side of the second positive electrode $21_2$, and a positive electrode current collector exposed portion $21D_{21}$ in which the inner surface of the positive electrode current collector $21A_2$ is exposed is provided. The positive electrode active material layer $21B_2$ is not provided on the outer surface of the end portion on the outer peripheral side of the second positive electrode $21_2$, and a positive electrode current collector exposed portion $21D_{22}$ in which the outer surface of the positive electrode current collector $21A_2$ is exposed is provided. The length of the positive electrode current collector exposed portion $21D_{22}$ in the winding direction is about one turn longer than the length of the positive electrode current collector exposed portion $21D_{21}$ in the winding direction.

A step portion at the boundary between the positive electrode current collector exposed portion $21D_{21}$ and the positive electrode active material layer $21B_2$ is covered with a protective tape $13D_{21}$, A step portion at the boundary between the positive electrode current collector exposed portion $21D_{22}$ and the positive electrode active material layer $21B_2$ is covered with a protective tape $13D_{22}$.

As the positive electrode active material capable of occluding and releasing lithium, for example, a lithium-containing compound such as lithium oxide, lithium phosphate, lithium sulfide, or an interlayer compound containing lithium is suitable, and two kinds or more thereof may be used in combination. To increase the energy density, a lithium-containing compound containing lithium, a transition metal element and oxygen (O) is preferable. Such a lithium-containing compound includes, for example, a lithium composite oxide having a layered rock salt type structure shown in Formula (A), a lithium composite phosphate having an olivine type structure shown in Formula (B) and the like. It is more preferable that the lithium-containing compound contains at least one of the group consisting of cobalt (Co), nickel, manganese (Mn) and iron (Fe) as a transition metal element. Examples of such a lithium-containing compound include a lithium composite oxide having a layered rock salt type structure shown in Formula (C), Formula (D), or Formula (E), a lithium composite oxide having a spinel type structure shown in Formula (F), or a lithium composite phosphate having an olivine type structure shown in Formula (G), and specifically, $LiNi_{0.50}Co_{0.20}Mn_{0.30}O_2$, $Li_aCoO_2$ (a≈1), $Li_bNiO_2$ (b≈1), $Li_{c1}Ni_{c2}Co_{1-c2}O_2$ (c1≈1, 0<c2<1), $Li_dMn_2O_4$ (d≈1), $Li_eFePO_4$ (e≈1) or the like are included.

$$Li_pNi_{(1-q-r)}Mn_qM1_rO_{(2-y)}X_z \quad (A)$$

(Where in the formula (A), M1 represents at least one element selected from Group 2 to Group 15 excluding nickel and manganese. X represents at least one of Group 16 elements and Group 17 elements other than oxygen. p, q, y, and z are values within the range of 0≤p≤1.5, 0≤q≤1.0, 0≤r≤1.0, −0.10≤y≤0.20, and 0≤z≤0.2)

$$Li_aM2_bPO_4 \quad (B)$$

(Where in the formula (B), M2 represents at least one element selected from Group 2 to Group 15). a and b are values within the range of 0≤a≤2.0 and 0.5≤b≤2.0)

$$Li_fMn_{(1-g-h)}Ni_gM3_hO_{(2-j)}F_k \quad (C)$$

(Where in the formula (C), M3 represents at least one of the group consisting of cobalt, magnesium (Mg), aluminum, boron (B), titanium (Ti), vanadium (V), chromium (Cr), iron, copper, zinc (Zn), zirconium (Zr), molybdenum (Mo), tin (Sn), calcium (Ca), strontium (Sr), and tungsten (W). f, g, h, j, and k are values within the range of 0.8≤f≤1.2, 0<g<0.5, 0≤h≤0.5, g+h<1, −0.1≤j≤0.2 and 0≤k≤0.1. Note that the composition of lithium differs depending on the state of charge and discharge, and the value of f represents a value in a completely discharged state.)

$$Li_mNi_{(1-n)}M4_nO_{(2-p)}F_q \quad (D)$$

(Where in the formula (D), M4 represents at least one of the group consisting of cobalt, manganese, magnesium, aluminum, boron, titanium, vanadium, chromium, iron, copper, zinc, molybdenum, tin, calcium, strontium, and tungsten, in, n, p, and q are values within the range of 0.8≤m≤1.2, 0.005≤n≤0.5, −0.1≤p≤0.2, and 0≤q≤0.1. Note that the composition of lithium differs depending on the state of charge and discharge, and the value of m represents a value in a completely discharged state.)

$$Li_rCo_{(1-s)}M5_sO_{(2-t)}F_u \quad (E)$$

(Where in the formula (E), M5 represents at least one of the group consisting of nickel, manganese, magnesium, aluminum, boron, titanium, vanadium, chromium, iron, copper, zinc, molybdenum, tin, calcium, strontium, and tungsten. r, s, t, and u are values within the range of $0.8 \leq r \leq 1.2$, $0 \leq s < 0.5$, $-0.1 \leq t \leq 0.2$, and $0 \leq u \leq 0.1$. Note that the composition of lithium differs depending on the state of charge and discharge, and the value of r represents a value in a completely discharged state.)

$$Li_v Mn_{2-w} M6_w O_x F_y \qquad (F)$$

(Where in the formula (F), M6 represents at least one of the group consisting of cobalt, nickel, magnesium, aluminum, boron, titanium, vanadium, chromium, iron, copper, zinc, molybdenum, tin, calcium, strontium, and tungsten, v, w, x, and y are values within the range of $0.9 \leq v \leq 1.1$, $0 \leq w \leq 0.6$, $3.7 \leq x \leq 4.1$, and $0 \leq y \leq 0.1$.

It should be understood that the composition of lithium differs depending on the state of charge and discharge, and the value of v represents a value in a completely discharged state.)

$$Li_z M7PO_4 \qquad (G)$$

(Where in the formula (G), M7 represents at least one of the group consisting of cobalt, manganese, iron, nickel, magnesium, aluminum, boron, titanium, vanadium, niobium (Nb), copper, zinc, molybdenum, calcium, strontium, tungsten, and zirconium. z is a value within the range of $0.9 \leq z \leq 1.1$. Note that the composition of lithium differs depending on the state of charge and discharge, and the value of z represents a value in a completely discharged state.)

The positive electrode active material capable of occluding and releasing lithium includes inorganic compounds not containing lithium, such as $MnO_2$, $V_2O_5$, $V_6O_{13}$, NiS and MoS.

The positive electrode active material capable of occluding and releasing lithium may be other than the above. Furthermore, two kinds or more of the positive electrode active materials exemplified above may be mixed in any combination.

As the binder, for example, at least one selected from resin materials such as polyvinylidene fluoride (PVdF), polytetrafluoroethylene (PTFE), polyacrylonitrile (PAN), styrene butadiene rubber (SBR) and carboxymethyl cellulose (CMC), and copolymers including these resin materials as a main component and the like is used.

Examples of the conductive agent include carbon materials such as graphite, carbon fiber, carbon black, Ketjen black, carbon nanotubes, or the like, and one of these may be used alone, or a mixture of two kinds or more thereof may be used. Furthermore, in addition to the carbon material, a metal material, a conductive polymer material, or the like may be used as long as the material has conductivity.

The negative electrode 22 includes a negative electrode current collector 22A and a negative electrode active material layer 22B provided on both surfaces of the negative electrode current collector 22A, and is located such that the negative electrode active material layer 22B and the positive electrode active material layers $21B_1$ and $21B_2$ face each other. The negative electrode current collector 22A is made of a metal foil such as a copper foil, a nickel foil, a stainless steel foil, or the like. The negative electrode active material layer 22B includes a negative electrode active material capable of occluding and releasing lithium, and a binder. The negative electrode active material layer 22B may further include a conductive agent, if necessary.

It should be understood that it is preferable that in the battery 10, the electrochemical equivalent of the negative electrode 22 or the negative electrode active material is larger than the electrochemical equivalent of the positive electrode 21, and theoretically, lithium metal does not precipitate on the negative electrode 22 during charging.

The negative electrode active material layer 22B is not provided on the inner surface of the end portion on the inner peripheral side of the negative electrode 22, and a negative electrode current collector exposed portion $22C_1$ in which the inner surface of the negative electrode current collector 22A is exposed is provided. The negative electrode active material layer 22B is not provided on the outer surface of the end portion on the inner peripheral side of the negative electrode 22, and a negative electrode current collector exposed portion $22C_2$ in which the outer surface of the negative electrode current collector 22A is exposed is provided. The negative electrode lead 11C is connected to the negative electrode current collector exposed portion $22C_2$. The length of the negative electrode current collector exposed portion $22C_1$ in the winding direction is about one turn longer than the length of the negative electrode current collector exposed portion $22C_2$ in the winding direction.

The negative electrode active material layer 22B is provided on the inner and outer surfaces of the end portion on the outer peripheral side of the negative electrode 22, and the inner and outer surfaces of the negative electrode current collector 22A are not exposed.

In the middle peripheral portion of the negative electrode 22, the portion facing the positive electrode current collector exposed portion $21C_{22}$ is not provided with the negative electrode active material layer 22B, but provided with a negative electrode current collector exposed portion $22E_1$ where the negative electrode current collector 22A is exposed. In the middle peripheral portion of the negative electrode 22, the portion facing the positive electrode current collector exposed portion $21C_{21}$ is not provided with the negative electrode active material layer 22B, but provided with a negative electrode current collector exposed portion $22E_2$ where the negative electrode current collector 22A is exposed.

Examples of the negative electrode active material include carbon materials such as non-graphitizable carbon, easily graphitizable carbon, graphite, pyrolytic carbons, cokes, glassy carbons, organic polymer compound fired bodies, carbon fibers, activated carbon, and the like. Among them, the cokes include pitch coke, needle coke, petroleum coke, and the like. An organic polymer compound fired body is obtained by firing and carbonizing a polymer material such as a phenol resin or a furan resin at an appropriate temperature, and some of them are classified as non-graphitizable carbon or easily graphitizable carbon. These carbon materials are preferable because a change in crystal structure that occurs during charge and discharge is very small, a high charge and discharge capacity can be obtained, and good cycle characteristics can be obtained. Particularly, graphite is preferable because it has a large electrochemical equivalent and can obtain a high energy density. Furthermore, non-graphitizable carbon is preferable because excellent cycle characteristics can be obtained.

Furthermore, a material having a low charge and discharge potential, specifically, a material having a charge and discharge potential close to that of lithium metal is preferable because a high energy density of the battery 10 can be easily realized.

In addition, other negative electrode active materials capable of increasing the capacity include materials containing at least one of metal elements and metalloid elements as a constituent element (for example, an alloy, a compound or a mixture). This is because if such a material is used, the high energy density can be obtained. In particular, using the material together with a carbon material is more preferable because the high energy density can be obtained and excellent cycle characteristics can be obtained. Note that alloys include alloys containing one or more metal elements and one or more metalloid elements in addition to alloys composed of two kinds or more metal elements in the present disclosure. In addition, it may contain a non-metal element. The structure may include a solid solution, a eutectic (eutectic mixture), an intermetallic compound, or a structure in which two kinds or more thereof coexist.

Examples of such a negative electrode active material include a metal element or a metalloid element capable of forming an alloy with lithium. Specifically, magnesium, boron, aluminum, titanium, gallium (Ga), indium (In), silicon (Si), germanium (Ge), tin, lead (Pb), bismuth (Bi), cadmium (Cd), silver (Ag), zinc, hafnium (Hf), zirconium, yttrium (Y), palladium (Pd) or platinum (Pt) is included. These may be crystalline or amorphous.

As the negative electrode active material, a material containing a metal element or a metalloid element belonging to Group 4B in the short-periodic table as a constituent element is preferable, and more preferable is a material containing at least one of silicon and tin as a constituent element. This is because silicon and tin have a high ability to occlude and release lithium, and can obtain a high energy density. Examples of such a negative electrode active material include a simple substance, an alloy, or a compound of silicon, a simple substance, an alloy, or a compound of tin, and a material having one or two kinds or more phases thereof as at least a portion.

Examples of the alloy of silicon include at least one of the group consisting of tin, nickel, copper, iron, cobalt, manganese, zinc, indium, silver, titanium, germanium, bismuth, antimony (Sb), and chromium as a second constituent element other than silicon. Examples of the alloy of tin include at least one of the group consisting of silicon, nickel, copper, iron, cobalt, manganese, zinc, indium, silver, titanium, germanium, bismuth, antimony, and chromium as a second constituent element other than tin.

Examples of the compound of tin or the compound of silicon include a compound containing oxygen or carbon, and may contain the above-described second constituent element in addition to tin or silicon.

Above all, a Sn-based negative electrode active material is preferably a SnCoC-containing material which includes cobalt, tin, and carbon as constituent elements, in which the carbon content is 9.9 mass % or more and 29.7 mass % or less, and a ratio of cobalt with respect to the total of tin and cobalt is 30 mass % or more and 70 mass % or less. This is because the high energy density can be obtained in such a composition range, and excellent cycle characteristics can be obtained.

This SnCoC-containing material may further contain other constituent elements, if necessary. As other constituent elements, for example, silicon, iron, nickel, chromium, indium, niobium, germanium, titanium, molybdenum, aluminum, phosphorus (P), gallium, or bismuth is preferable, and two kinds or more elements may be contained. This is because the capacity or cycle characteristics can be further improved.

It should be understood that the SnCoC-containing material has a phase containing tin, cobalt, and carbon, and this phase preferably has a low crystallinity or an amorphous structure. In addition, it is preferable in this SnCoC-containing material that at least a part of carbon as a constituent element is bonded to a metal element or a metalloid element as another constituent element. This is because it is considered that the decrease in cycle characteristics is due to the aggregation or crystallization of tin, or the like, but such aggregation or crystallization can be suppressed by carbon bonding to other elements.

Examples of a measuring method for examining the bonding state of elements include X-ray photoelectron spectroscopy (XPS). In XPS, the peak of the carbon 1s orbital (C1s) for graphite is shown in 284.5 eV in a device that is energy-calibrated to obtain the peak of 4f orbital (Au4f) of gold atoms in 84.0 eV. In addition, in the case of surface contamination carbon, the peak is shown in 284.8 eV On the other hand, in the case of higher electric charge density of the carbon element, for example, when carbon is bonded to a metal element or a metalloid element, the peak of C1s is shown in a region lower than 284.5 eV. That is, when the peak of the composite wave of C1s obtained for the SnCoC-containing material is shown in a region lower than 284.5 eV, at least a part of the carbon contained in the SnCoC-containing material is bonded to a metal element or a metalloid element as another constituent element.

It should be understood that in the XPS measurement, for example, the peak of C1s is used for correcting the energy axis of the spectrum. Normally, since surface contamination carbon exists on the surface, the peak of C1s of surface contamination carbon is set to 284.8 eV, which is used as an energy reference value. Since the waveform of the peak of C1s is obtained as a form including the peak of the surface contamination carbon and the peak of the carbon in the SnCoC-containing material in XPS measurement, the peak of the surface contamination carbon is separated from the peak of carbon in the SnCoC-containing material, for example, by performing an analysis using a commercially available software. In the analysis of the waveform, the position of the main peak existing on the lowest bound energy side is set as the energy reference value (284.8 eV).

Examples of other negative electrode active materials include metal oxides, polymer compounds, or the like capable of occluding and releasing lithium. Examples of the metal oxide include lithium titanium oxide containing titanium and lithium, such as lithium titanate ($Li_4Ti_5O_{12}$), iron oxide, ruthenium oxide, molybdenum oxide, or the like. Examples of the polymer compound include polyacetylene, polyaniline, polypyrrole, and the like.

As the binder, at least one selected from a resin material such as polyvinylidene fluoride, polytetrafluoroethylene, polyacrylonitrile, styrene butadiene rubber, carboxymethyl cellulose, and the like, and copolymers including these resin materials as a main component, and the like is used.

Examples of the conductive agent include carbon materials such as graphite, carbon fiber, carbon black, Ketjen black, carbon nanotubes, or the like, and one of these may be used alone, or a mixture of two kinds or more thereof may be used. Furthermore, in addition to the carbon material, a metal material, a conductive polymer material, or the like may be used as long as the material has conductivity.

The separator 23 separates the positive electrode 21 and the negative electrode 22 and allows lithium ions to pass therethrough while preventing current short circuit due to contact between the two electrodes. The separator 23 is configured by a porous film made of a resin such as polytetrafluoroethylene, polypropylene, polyethylene, or the like, and may have a structure in which two kinds or more of these porous films are laminated. Above all, a porous film made of polyolefin is preferable because it has an excellent short circuit prevention effect and can improve the safety of the battery by a shutdown effect. In particular, polyethylene is preferable as a material configuring the separator 23 because it can obtain a shutdown effect in the range of 100° C. or more and 160° C. or less and has excellent electrochemical stability. Alternatively, a material obtained by copolymerizing or blending a resin having chemical stability with polyethylene or polypropylene can be used. Alternatively, the porous film may have a structure of three or more layers in which a polypropylene layer, a polyethylene layer, and a polypropylene layer are sequentially laminated.

The separator 23 may have a configuration including a substrate and a surface layer provided on one or both surfaces of the substrate. The surface layer includes inorganic particles having electrical insulation properties, and a resin material that binds the inorganic particles to the surface of the substrate and binds the inorganic particles to each other. This resin material may have a three-dimensional network structure in which, for example, fibrils are formed and fibrils are connected to each other continuously. By supporting the inorganic particles on the resin material having the three-dimensional network structure, the inorganic particles can maintain a dispersed state without being connected to each other. In addition, the resin material may bind the surface of the substrate or the inorganic particles to each other without fibrillation. In this case, higher binding properties can be obtained. By providing a surface layer on one or both surfaces of the substrate as described above, oxidation resistance, heat resistance and mechanical strength can be imparted to the substrate.

The substrate is a porous layer having porosity. More specifically, the substrate is a porous film configured by an insulating film having high ion permeability and a predetermined mechanical strength, and the electrolytic solution is held in pores of the substrate. It is preferable that the substrate has a predetermined mechanical strength as a main part of the separator, while having a property of high resistance to an electrolytic solution, low reactivity and low expansion.

It is preferable to use, for example, a polyolefin resin such as polypropylene or polyethylene, an acrylic resin, a styrene resin, a polyester resin or a nylon resin as the resin material configuring the substrate. In particular, polyethylene such as low-density polyethylene, high-density polyethylene or linear polyethylene, or a low-molecular-weight wax component thereof, or a polyolefin resin such as polypropylene is suitably used because it has an appropriate melting temperature and is easily available. In addition, it may be a structure in which two kinds or more of porous films are laminated, or a porous film formed by melting and kneading two kinds or more kinds of resin materials. The one including a porous film made of a polyolefin resin is excellent in the separability between the positive electrode 21 and the negative electrode 22, and can further reduce the reduction of the internal short circuit.

A nonwoven fabric may be used as the substrate. Aramid fiber, glass fiber, polyolefin fiber, polyethylene terephthalate (PET) fiber, nylon fiber, or the like can be used as the fiber configuring the nonwoven fabric. In addition, these two kinds or more of fibers may be mixed to form a nonwoven fabric.

The inorganic particles include at least one of a metal oxide, a metal nitride, a metal carbide, a metal sulfide, and the like. As the metal oxide, aluminum oxide (alumina, $Al_2O_3$), boehmite (hydrated aluminum oxide), magnesium oxide (magnesia, MgO), titanium oxide (titania, $TiO_2$), zirconium oxide (zirconia, $ZrO_2$), silicon oxide (silica, $SiO_2$), yttrium oxide (yttria, $Y_2O_3$), or the like can be suitably used. As the metal nitride, silicon nitride ($Si_3N_4$), aluminum nitride (AlN), boron nitride (BN), titanium nitride (TiN), or the like can be suitably used. As the metal carbide, silicon carbide (SiC), boron carbide ($B_4C$), or the like can be suitably used. As the metal sulfide, barium sulfate ($BaSO_4$), or the like can be suitably used. In addition, porous aluminosilicates such as zeolites ($M_{2/n}O \cdot Al_2O_3 \cdot xSiO_2 \cdot yH_2O$, M is a metal element, $x \geq 2$, $y \geq 0$), layered silicates and a mineral such as barium titanate ($BaTiO_3$) or strontium titanate ($SrTiO_3$) may be used. Above all, it is preferable to use alumina, titania (particularly having a rutile structure), silica or magnesia, and more preferably to use alumina. The inorganic particles have oxidation resistance and heat resistance, and the surface layer on the side facing the positive electrode containing the inorganic particles has strong resistance to an oxidizing environment near the positive electrode during charging. The shape of the inorganic particles is not particularly limited, and any of a spherical shape, a plate shape, a fiber shape, a cubic shape, a random shape, and the like can be used.

Examples of the resin material configuring the surface layer include a resin or the like such as a fluorine-containing resin such as polyvinylidene fluoride and polytetrafluoroethylene, a fluorine-containing rubber such as a vinylidene fluoride-tetrafluoroethylene copolymer and an ethylene-tetrafluoroethylene copolymer, rubbers such as styrene-butadiene copolymer or hydride thereof, acrylonitrile-butadiene copolymer or hydride thereof, acrylonitrile-butadiene-styrene copolymer or hydride thereof, methacrylic acid ester-acrylic acid ester copolymer, styrene-acrylic acid ester copolymer, acrylonitrile-acrylic acid ester copolymer, ethylene propylene rubber, polyvinyl alcohol, and polyvinyl acetate, cellulose derivatives such as ethyl cellulose, methyl cellulose, hydroxyethyl cellulose and carboxymethyl cellulose, polyphenylene ether, polysulfone, polyether sulfone, polyphenylene sulfide, polyetherimide, polyimide, polyamide such as wholly aromatic polyamide (aramid), polyamideimide, polyacrylonitrile, polyvinyl alcohol, polyether, acrylic resin or polyester in which at least one of the melting point and the glass transition temperature is 180° C. or more and high heat resistance is provided. These resin materials may be used alone or as a mixture of two kinds or more. Above all, from the viewpoint of oxidation resistance and flexibility, a fluororesin such as poly vinylidene fluoride is preferable, and from the viewpoint of heat resistance, it is preferable to contain aramid or polyamideimide.

The particle size of the inorganic particles is preferably within the range of 1 nm to 10 μm. If it is smaller than 1 nm, it is difficult to obtain, and even if it can be obtained, it is not worth the cost. On the other hand, if it is larger than 10 μm, the distance between the electrodes becomes large, and a sufficient amount of the active material cannot be obtained in a limited space, so that the battery capacity decreases.

As a method for forming the surface layer, such a method can be used that a slurry consisting of, for example, a matrix resin, a solvent and an inorganic substance is applied on a substrate (porous film), and the mixture is passed through a poor solvent for the matrix resin and a solvent-friendly bath of the above solvent to separate the phases, and then drying them.

It should be understood that the inorganic particles described above may be contained in a porous film as a substrate. In addition, the surface layer may not include the inorganic particles, and may be made only of the resin material.

The separator 23 is impregnated with an electrolytic solution that is a liquid electrolyte. The electrolytic solution includes a solvent and an electrolyte salt dissolved in the solvent. The electrolytic solution may include a publicly known additive to improve battery characteristics.

As the solvent, a cyclic carbonate ester such as ethylene carbonate or propylene carbonate can be used, and it is preferable to use one of ethylene carbonate and propylene carbonate, particularly a mixture of both. This is because cycle characteristics can be improved.

In addition to these cyclic carbonate esters as the solvent, it is also preferable to use a mixture with a chain carbonate ester such as diethyl carbonate, dimethylcarbonate, ethyl methyl carbonate or methyl propyl carbonate. This is because high ion conductivity can be obtained.

Furthermore, it is preferable that the solvent further includes 2,4-difluoroanisole or vinylene carbonate. This is because 2,4-difluoroanisole can improve discharge capacity, and vinylene carbonate can improve cycle characteristics. Therefore, it is preferable to use a mixture of these, because the discharge capacity and cycle characteristics can be improved.

In addition thereto, butylene carbonate, γ-butyrolactone, γ-valerolactone, 1,2-dimethoxyethane, tetrahydrofuran, 2-methyltetrahydrofuran, 1,3-dioxolan, 4-methyl-1,3-dioxolane, methyl acetate, methyl propionate, acetonitrile, glutaronitrile, adponitrile, methoxyacetonitrile, 3-methoxypropyronitrile, N,N-dimethylformamide, N-methylpyrrolidinone, N-methyloxazolidinone, N,N-dimethyl imidazolidinone, nitromethane, nitroethane, sulfolane, dimethylsulfoxide, trimethyl phosphate, and the like are included as the solvent.

It should be understood that a compound in which at least a part of hydrogen of these non-aqueous solvents is substituted with fluorine may be preferable because the reversibility of the electrode reaction may be able to be improved depending on the kind of the electrode to be combined.

Examples of the electrolyte salt include a lithium salt, and one kind may be used alone, or two kinds or more may be used in combination. As the lithium salt, $LiPF_6$, $LiBF_4$, $LiAsF_6$, $LiClO_4$, $LiB(C_6H_5)_4$, $LiCH_3SO_3$, $LiCF_3SO_3$, $LiN(SO_2CF_3)_2$, $LiC(SO_2CF_3)_3$, $LiAlCl_4$, $LiSiF_6$, LiCl, difluoro[oxalate-O,O'] lithium borate, lithium bisoxalate borate, LiBr, and the like are included.

Above all, $LiPF_6$ is preferable because it can obtain high ion conductivity and can improve cycle characteristics.

The positive electrode potential in the fully charged state is preferably higher than 4.20 V, more preferably 4.25 V or higher, still more preferably higher than 4.40 V, particularly preferably 4.45 V or higher, and most preferably 4.50 V or higher. However, the positive electrode potential (vsLi/Li$_+$) in the fully charged state may be 4.20 V or lower. The upper limit value of the positive electrode potential (vsLi/Li$_+$) in the fully charged state is not particularly limited, but is preferably 6.00 V or lower, more preferably 5.00 V or lower, still more preferably 4.80 V or lower, and particularly preferably 4.70 V or lower.

In the battery having the above-described configuration, when charged, lithium ions are released from the positive electrode active material layers $21B_1$ and $21B_2$ and occluded in the negative electrode active material layer 22B via the electrolytic solution. In addition, when discharging is performed, lithium ions are released from the negative electrode active material layer 22B and occluded in the positive electrode active material layers $21B_1$ and $21B_2$ via the electrolytic solution.

Comparison between Battery with Positive Electrode not Divided and Electrode with Positive Electrode Divided is Described Below in Details.

As shown in FIG. 4A, when a short circuit 41 due to an external scratch or the like occurs near the surface layer of a battery 110 having an undivided positive electrode 121, a discharge reaction occurs rapidly in the entire battery, and a short-circuit current I concentrates on a short-circuit portion. Therefore, a large amount of heat is generated in the vicinity of the short-circuit portion, and in some cases, a thermal runaway may occur.

In the process where the short-circuit current I concentrates on the short-circuit portion, if the current collecting resistance in the battery 10 is high, the short-circuit current becomes small. Therefore, in the battery 10 according to the first embodiment, as shown in FIG. 4B, such a configuration is adopted that the positive electrode 21 is divided into the first and second positive electrodes $21_1$ and $21_2$, the positive electrode leads 11A and 11B are attached to the first and second positive electrodes $21_1$ and $21_2$, respectively, one end of each of the positive electrode leads 11A and 11B thereof is drawn out of the exterior material 30, and electrically connected outside the exterior material 30. By adopting such a configuration, the advantage that the resistance can be reduced can be obtained, and the short-circuit current from the first positive electrode $21_1$ where the short circuit 41 does not occur always passes through the positive electrode leads 11A and 11B, so that the short-circuit current flowing into the short-circuit portion is reduced, and as a result, safety is improved. The adoption of this configuration causes a slight decrease in energy density. Therefore, a battery having high safety while suppressing a decrease in energy density can be obtained.

Next, an example of a method for manufacturing the battery 10 according to the first embodiment will be described.

The first positive electrode $21_1$ is produced as follows. First, for example, a positive electrode active material, a conductive agent, and a binder are mixed to prepare a positive electrode mixture, and the positive electrode mixture is dispersed in a solvent such as N-methyl-2-pyrrolidone (NMP) to produce a paste-like positive electrode mixture slurry. Next, this positive electrode mixture slurry is applied to both surfaces of the positive electrode current collector $21A_1$. Subsequently the solvent contained in the coating film is dried, and compression molding is performed by a roll press or the like to form the positive electrode active material layer $21B_1$. Thereby, the first positive electrode $21_1$ having the positive electrode current collector exposed portions $21C_{11}$ and $C_{12}$ is obtained at one end portion (the end portion that becomes the inner peripheral side after the wind. Next, after the positive electrode lead 11A having the sealant 12A is attached to the positive electrode current collector exposed portion $21C_{12}$ by welding or the like, the positive electrode current collector exposed portion $21C_{12}$, and the step portion at the boundary between the positive electrode current collector exposed portion $21C_{12}$ and the positive electrode active material layer $21B_1$ are covered with the protective tape $13C_{12}$. In addition, the positive electrode current collector exposed portion $21C_{11}$ and the step portion at the boundary between the positive electrode current collector exposed portion $21C_{11}$ and the positive electrode active material layer $21B_1$ are covered with the protective tape $13C_{11}$.

The second positive electrode $21_2$ is produced as follows. First, the positive electrode active material layers $21B_2$ are formed on both surfaces of the positive electrode current collector $21A_2$, in the same manner as in the production step of the first positive electrode $21_1$. Thereby, the second positive electrode $21_2$ having the positive electrode current collector exposed portions $21C_{21}$ and $21C_{22}$ at one end portion (the end portion that becomes the inner peripheral side after the winding) of the second positive electrode $21_2$ and the positive electrode current collector exposed portions $21D_{21}$ and $21D_{22}$ at the other end portion (the end portion that becomes the outer peripheral side after the winding) is obtained. Next, after the positive electrode lead 11B having the sealant 12B is attached to the positive electrode current collector exposed portion $21C_{22}$ by welding or the like, the positive electrode current collector exposed portion $21C_{22}$ and the step portion at the boundary between the positive electrode current collector exposed portion $21C_{22}$ and the positive electrode active material layer $21B_2$ are covered with the protective tape $13C_{22}$. In addition, the positive electrode current collector exposed portion $21C_{21}$ and the step portion at the boundary between the positive electrode current collector exposed portion $21C_{21}$ and the positive electrode active material layer $21B_2$ are covered with the protective tape $13C_{21}$. Subsequently, the positive electrode current collector exposed portion $21D_{21}$ and the step portion at the boundary of the positive electrode active material layers $21B_2$ are covered with the protective tape $13D_{21}$. In addition, the positive electrode current collector exposed portion $21D_{22}$ and the step portion at the boundary of the positive electrode active material layers $21B_2$ are covered with the protective tape $13D_{22}$.

The negative electrode 22 is produced as follows. First, for example, a negative electrode mixture is prepared by mixing a negative electrode active material and a binder, and this negative electrode mixture is dispersed in a solvent such as N-methyl-2-pyrrolidone to produce a paste-like negative electrode mixture slurry. Next, this negative electrode mixture slurry is applied to both surfaces of the negative electrode current collector 22A, the solvent is dried, and compression molding is performed by a roll press or the like to form the negative electrode active material layer 22B. With this configuration, the negative electrode 22 having the negative electrode current collector exposed portions $22C_1$ and $22C_2$ at one end portion (the end portion that becomes the inner peripheral side after the winding) and the negative electrode current collector exposed portions $22E_1$ and $22E_2$ at the middle peripheral portion is obtained. Subsequently, the negative electrode lead 11C having the sealant 12C is attached to the negative electrode current collector exposed portion $22C_2$ by welding or the like.

The wound-type electrode body 20 is produced as follows. First, after the first positive electrode $21_1$ and the negative electrode 22 are wound around a flat core with the separator 23 interposed therebetween and wound many times in the longitudinal direction, the second positive electrode $21_2$ and the negative electrode 22 are wound around the flat core with the separator 23 interposed therebetween and wound many times in the longitudinal direction. Subsequently a protective tape (not shown) is adhered to the outermost peripheral portion to obtain the electrode body 20.

The electrode body 20 is accommodated in the exterior material 30 as follows. First, a rectangular exterior material 30 is prepared, and embossing molding is performed on one region in a surface on the second resin layer side thereof, which is bisected by the central portion 30A in a long side direction of the exterior material 30 to form the accommodating portion 32. Next, the electrode body 20 is accommodated in the accommodating portion 32 such that the positive electrode leads 11A and 11B and the negative electrode lead 11C are led out from the short side of the exterior material 30. Then, the exterior material 30 is folded back with respect to the central portion 30A, and each side is overlapped. At this time, the sealants 12A, 12B, and 12C that the positive electrode leads 11A and 11B and the negative electrode lead 11C have, respectively, are stuck at the peripheral portion of the exterior material 30. Note that when each side is overlapped, the sealants 12A and 12B may be inserted between the exterior material 30 and the positive electrode leads 11A and 11B, and between the positive electrode leads 11A and 11B, and the sealant 12C may be inserted between the exterior material 30 and the negative electrode lead 11C.

Subsequently, two of the three sides of the overlapped exterior material 30 are heat-sealed, one side is left as an opening without being heat-sealed, and an electrolytic solution is injected from this opening, and then the remaining one side of the exterior material 30 is heat-sealed under reduced pressure. Thereby, the electrode body 20 is sealed with the exterior material 30, and the battery 10 is obtained. Next, if necessary, the battery 10 is molded by a heat press. More specifically, the battery 10 is heated at a temperature higher than the room temperature while being pressurized. Finally, the positive electrode leads 11A and 11B are electrically connected to each other outside of the exterior material by welding or the like. Thus, the battery 10 shown in FIG. 1A is obtained.

In the battery 10 according to the first embodiment, the positive electrode 21 is divided into the first and second positive electrodes $21_1$ and $21_2$ adjacent in the winding direction, the first and second positive electrodes $21_1$ and $21_2$ have the positive electrode leads 11A and 11B, respectively, and the positive electrode leads 11A and 11B are electrically connected to each other outside the exterior material 30. This can improve the safety in the case where a short circuit occurs due to an external scratch or the like near the surface layer of the battery 10.

In the first embodiment described above, the case where the positive electrode 21 is divided into two electrodes adjacent in the winding direction has been described, but the positive electrode 21 may be divided into three or more electrodes adjacent in the winding direction. When the number of layers of the electrode body 20 is an even number, the upper limit of the number of divisions of the positive electrode 21 is preferably equal to or less than one half of a number N of layers of the electrode body 20. When the number of layers of the electrode body 20 is an odd number, it is preferably equal to or less than one half of (a number N-1 of layers of the electrode body 20). This is because if the number of layers of the electrode body 20 is too large, the thickness of the battery 10 increases due to an increase in the number of positive electrode leads. In addition, if the number of layers of the electrode body 20 is too large, the current may be concentrated too much on the positive electrode lead when a short circuit occurs, so that safety may be reduced.

Figure 5:
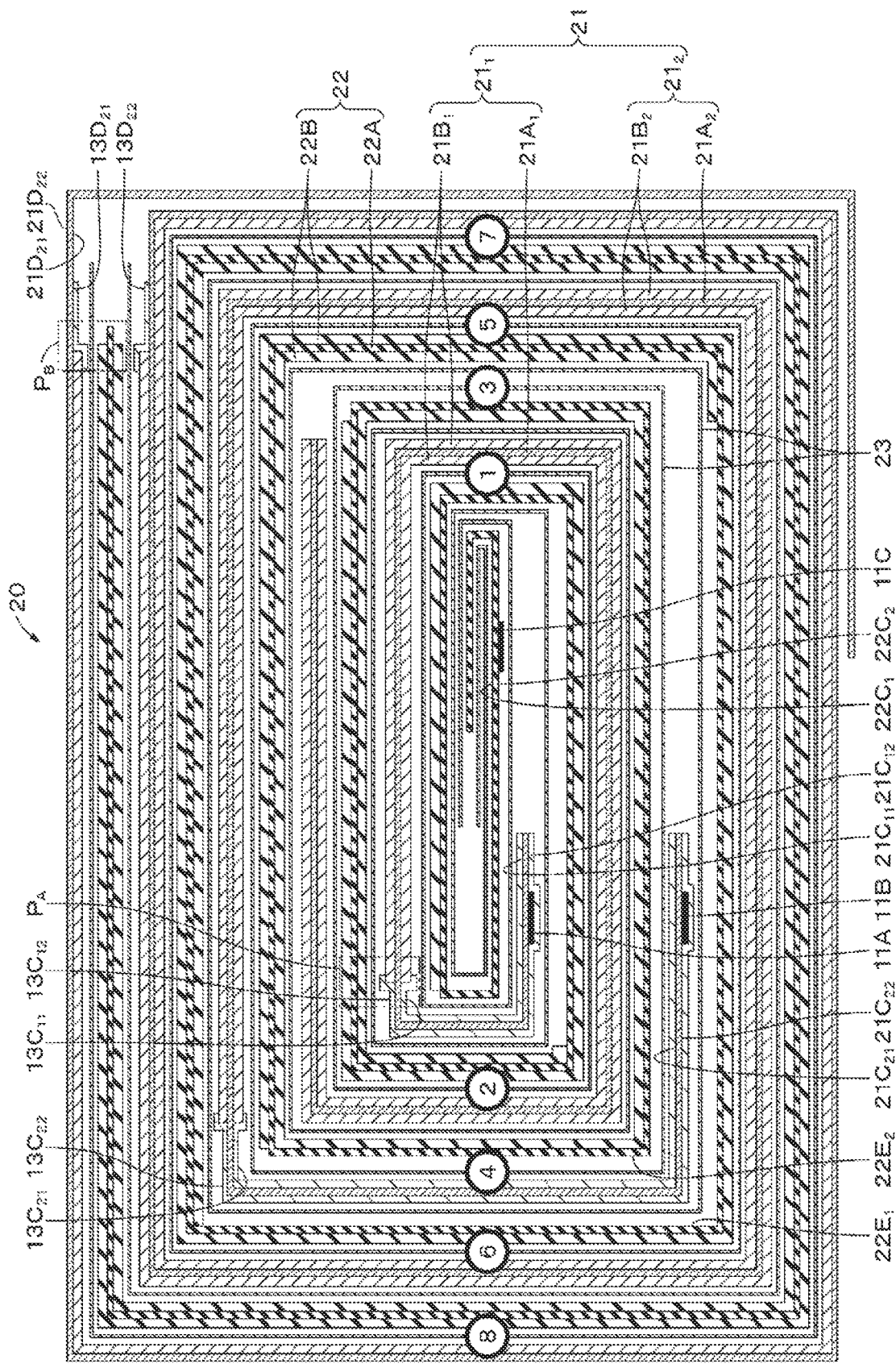
FIG. 5 is a cross-sectional view for describing a definition of a number of layers of an electrode body according an embodiment of the present disclosure.

The definition of the total number of the electrode bodies 20 will be described with reference to FIG. 5. Here, the positive electrode active material layers $21B_1$ and $21B_2$ are collectively referred to as a positive electrode active material layer 21B without distinction. The number of folded pairs of the positive electrode 21 and the negative electrode 22 with the separator 23 interposed therebetween from a position PA where a facing portion of the positive electrode active material layer 21B and the negative electrode active material layer 22B starts to a position $P_B$ where it ends is defined as the number of layers of the electrode body 20. Note that even if there is a portion where at least one electrode of the positive electrode 21 and the negative electrode 22 or at least one active material layer of the positive electrode active material layer 21B and the negative electrode active material layer 22B does not exist due to the division, the number of folded pairs of the positive electrode 21 and the negative electrode 22 is counted assuming that the electrode or the active material layer exists. For example, in the case of the electrode body 20 shown in FIG. 5, the number of folded pairs of the positive electrode 21 and the negative electrode 22 with the separator 23 interposed therebetween according to the above definition is eight. Therefore, the number of layers of the electrode body 20 shown in FIG. 5 is eight.

In the first embodiment described above, the case where the positive electrode 21 is divided into two electrodes so as to be adjacent in the winding direction has been described, but the negative electrode 22 may be divided into two or more electrodes so as to be adjacent in the winding direction, or both the positive electrode 21 and the negative electrode 22 may be divided into two or more electrodes so as to be adjacent in the winding direction.

In the first embodiment described above, the case where the positive electrode leads 11A and 11B are provided so as to overlap in the thickness direction of the electrode body 20 has been described, but the positive electrode leads 11A and 11B may be provided so as not to overlap in the thickness direction of the electrode body 20. In this case, the positive electrode leads 11A and 11B are electrically connected by a conductive member such as a metal plate, a circuit board or the like outside the exterior material 30.

In the first embodiment described above, the case where the positive electrode leads 11A and 11B are provided at the end portions on the inner peripheral side of the first positive electrode $21_1$ and the second positive electrode $21_2$, respectively, has been described, but the position where the positive electrode leads 11A and 11B are provided is not limited thereto. For example, the positive electrode lead 11A may be provided at the end portion on the inner peripheral side of the first positive electrode $21_1$, and the positive electrode lead 11B may be provided at the end portion on the outer peripheral side of the second positive electrode $21_2$. The positive electrode lead 11A may be provided at the end portion on the outer peripheral side of the first positive electrode $21_1$, and the positive electrode lead 11B may be provided at the end portion on the inner peripheral side of the second positive electrode $21_2$. The positive electrode leads 11A and 11B may be provided at the end portions on the outer peripheral side of the first and second positive electrodes $21_1$ and $21_2$, respectively. However, it is preferable that the second positive electrode $21_2$ located on the outer peripheral side of the first and second positive electrodes $21_1$ and $21_2$ has the positive electrode lead 11B at the end portion on the inner peripheral side. This is because safety can be further improved.

In the first embodiment, the case where the battery 10 is a lithium ion secondary battery has been described, but the type of the battery 10 is not limited thereto. For example, it may be a lead storage battery, a lithium ion polymer secondary battery, an all-solid battery, a nickel-metal hydride battery, a nickel-cadmium battery, a nickel-iron battery, a nickel-zinc battery, a silver oxide-zinc battery, and the like.

In the first embodiment, the configuration in which the flat electrode body 20 is accommodated in the exterior material 30 has been described, but the shape of the electrode body 20 is not limited thereto, and may be a polyhedral shape such as a columnar shape, a cubic shape, and the like.

The battery 10 is not limited to a general battery having rigidity, and may be a flexible battery that can be mounted on a wearable terminal such as a smart watch, a head-mounted display and iGlass (registered trademark).

In the first embodiment, the configuration in which the electrode includes the current collector and the active material layer has been described as an example, but the configuration of the electrode is not limited thereto. For example, the electrode may be configured to include only the active material layer.

In the first embodiment, an example in which the present disclosure is applied to the battery 10 including the electrolytic solution as the electrolyte has been described, but the electrolyte is not limited thereto. For example, the battery 10 may include an electrolyte layer containing an electrolytic solution and a polymer compound serving as a holder for holding the electrolytic solution between the positive electrode 21 and the separator 23 and between the negative electrode 22 and the separator 23. In this case, the electrolyte may be in a gel state.

The electrolytic solution is the same as the electrolytic solution according to the first embodiment. Examples of the polymer compound include polyacrylonitrile, polyvinylidene fluoride, a copolymer of vinylidene fluoride and hexafluoropropylene, polytetrafluoroethylene, polyhexafluoropropylene, polyethylene oxide, polypropylene oxide, polyphosphazene, polysiloxane, polyvinyl acetate, polyvinyl alcohol, polymethyl methacrylate, polyacrylic acid, polymethacrylic acid, styrene-butadiene rubber, nitrile-butadiene rubber, polystyrene, or polycarbonate. In particular, from the viewpoint of electrochemical stability, polyacrylonitrile, polyvinylidene fluoride, polyhexafluoropropylene, or polyethylene oxide is preferable.

It should be understood that the same inorganic substance as that described in the description of the resin layer of the separator 23 in the first embodiment may be included in the electrolyte layer. This is because heat resistance can be further improved.

In the first embodiment, the case where the positive electrode leads 11A and 11B and the negative electrode lead 11C are led out from the top side of the exterior material 30 has been described, but may be led out from the side, or may be led out from the bottom side. Note that when the positive electrode leads 11A and 11B and the negative electrode lead 11C are led out from the bottom side, such a configuration is only needed that the electrode body 20 is sandwiched between two rectangular exterior materials 30, and four sides of the two exterior materials 30 are sealed. In addition, the positive electrode leads 11A and 11B and the negative electrode lead 11C may be led out in different directions.

In the first embodiment, the case where the positive electrode leads 11A and 11B are provided so as to overlap in the thickness direction of the electrode body 20 and are electrically connected outside the exterior material 30 has been described, but they may be electrically connected by the seal portion 31A. However, since the distance of the short-circuit current passing through the positive electrode leads 11A and 11B when the positive electrode leads 11A and 11B are electrically connected outside the exterior material 30 becomes longer and the short-circuit current flowing into the short-circuit portion becomes smaller as compared with a case where the positive electrode leads 11A and 11B are connected by the seal portion, the safety is further improved.

Figure 6:
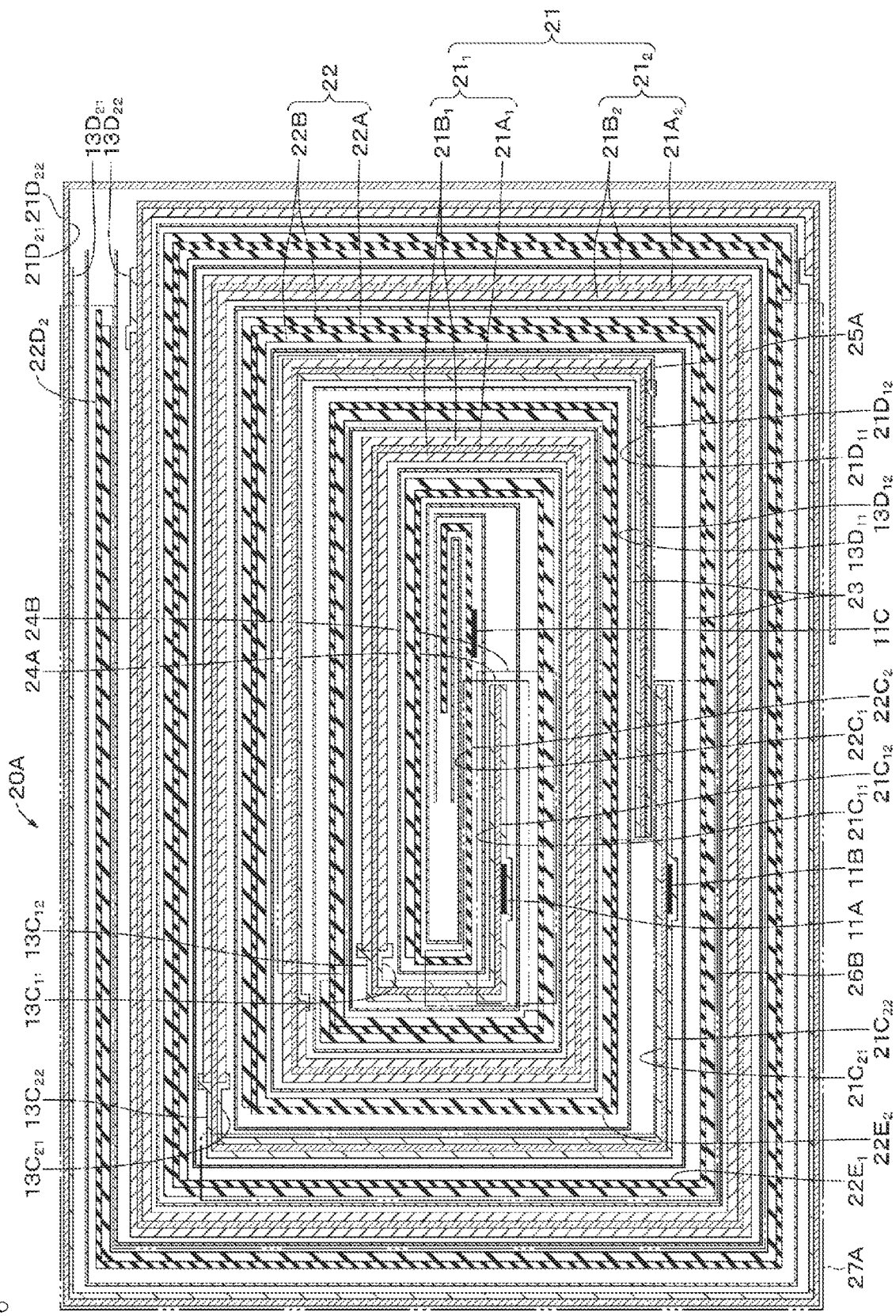
FIG. 6 is an exploded perspective view showing an example of a configuration of a battery according to an embodiment of the present disclosure.

Hereinafter, an example of an electrode body 20A included in a battery according to the second embodiment will be described with reference to FIG. 6. It should be understood that, in the second embodiment, the same or corresponding portions as those in the first embodiment are denoted by the same reference numerals, and description thereof is omitted.

The positive electrode active material layer $21B_1$ is not provided on the inner surface of the end portion on the outer peripheral side of the first positive electrode $21_1$, and a positive electrode current collector exposed portion $21D_{11}$ in which the inner surface of the positive electrode current collector $21A_1$ is exposed is provided. The positive electrode active material layer $21B_1$ is not provided on the outer surface of the end portion on the outer peripheral side of the first positive electrode $21_1$, and a positive electrode current collector exposed portion $21D_{12}$ in which the outer surface of the positive electrode current collector $21A_1$ is exposed is provided. The length of the positive electrode current collector exposed portion $21D_{11}$ in the winding direction is about one half turn longer than the length of the positive electrode current collector exposed portion $21D_{12}$ in the winding direction.

The positive electrode current collector exposed portion $21D_{11}$ and the step portion at the boundary between the positive electrode current collector exposed portion $21D_{11}$ and the positive electrode active material layer $21B_1$ are covered with a protective tape $13D_{11}$.

The positive electrode current collector exposed portion $21D_{12}$ and the step portion at the boundary between the positive electrode current collector exposed portion $21D_{12}$ and the positive electrode active material layer $21B_1$ are covered with a protective tape $13D_{12}$.

The negative electrode active material layer 22B is not provided on the outer surface of the end portion on the outer peripheral side of the negative electrode 22, and a negative electrode current collector exposed portion $22D_2$ in which the outer surface of the negative electrode current collector 22A is exposed is provided.

The positive electrode current collector exposed portion $21C_{11}$ on the inner peripheral side of the first positive electrode $21_1$ and the negative electrode current collector exposed portion $22C_2$ on the inner peripheral side of the negative electrode 22 configure a facing portion 24A facing each other with the separator 23 interposed therebetween. The positive electrode current collector exposed portion $21C_{12}$ on the inner peripheral side of the first positive electrode $21_1$ and the negative electrode current collector exposed portion $22C_1$ on the inner peripheral side of the negative electrode 22 configure a facing portion 24B facing each other with the separator 23 interposed therebetween. Note that in the following, the facing portions 24A and 24B provided on the inner peripheral side of the first positive electrode $21_1$ are referred to as the facing portion 24 unless particularly distinguished. The positive electrode current collector exposed portion $21D_{11}$ on the outer peripheral side of the first positive electrode $21_1$ and the negative electrode current collector exposed portion $22E_2$ on the middle peripheral portion of the negative electrode 22 configure a facing portion 25A facing each other with the separator 23 interposed therebetween.

The positive electrode current collector exposed portion $21C_{22}$ on the inner peripheral side of the second positive electrode $21_2$, and the negative electrode current collector exposed portion $22E_1$ on the middle peripheral portion of the negative electrode 22 configure a facing portion 26B facing each other with the separator 23 interposed therebetween. The positive electrode current collector exposed portion $21D_{21}$ on the outer peripheral side of the second positive electrode $21_2$ and the negative electrode current collector exposed portion $22D_2$ on the outer peripheral side of the negative electrode 22 configure a facing portion 27A facing each other with the separator 23 interposed therebetween.

The facing portions 24A, 24B, 25A, 26B, and 27A are provided over a range of preferably one quarter turn or more, more preferably half turn or more, still more preferably one turn or more, based on a top of a rewind portion of the facing portions 24A, 24B, 25A, 26B, and 27A from the viewpoint of improving safety. Here, the rewind portion means a curved portion of the facing portions 24A, 24B, 25A, 26B, and 27A of the current collector exposed portion, and when the facing portions 24A, 24B, 25A, 26B, and 27A of the current collector exposed portion are rewound so as to be folded, it means the folded portion.

The facing portions 24A, 24B, 25A, 26B, and 27A are provided over a range of preferably two turns or less, more preferably, one turn or less, based on the top of the folded portion of the facing portions 24A, 24B, 25A, 26B, and 27A from the viewpoint of suppressing a decrease in energy density.

In the battery according to the second embodiment, the facing portions 24 and 25A are provided on the inner and outer peripheral sides of the first positive electrode $21_1$, respectively, and the facing portions 26B, 27A are provided on the inner and outer peripheral sides of the second positive electrode $21_2$, respectively. Therefore, safety can be further improved.

The configuration of the facing portion in the electrode body 20A is not limited to the configuration in the second embodiment described above, and for example, the configuration of the facing portion described below may be adopted.

Figure 7:
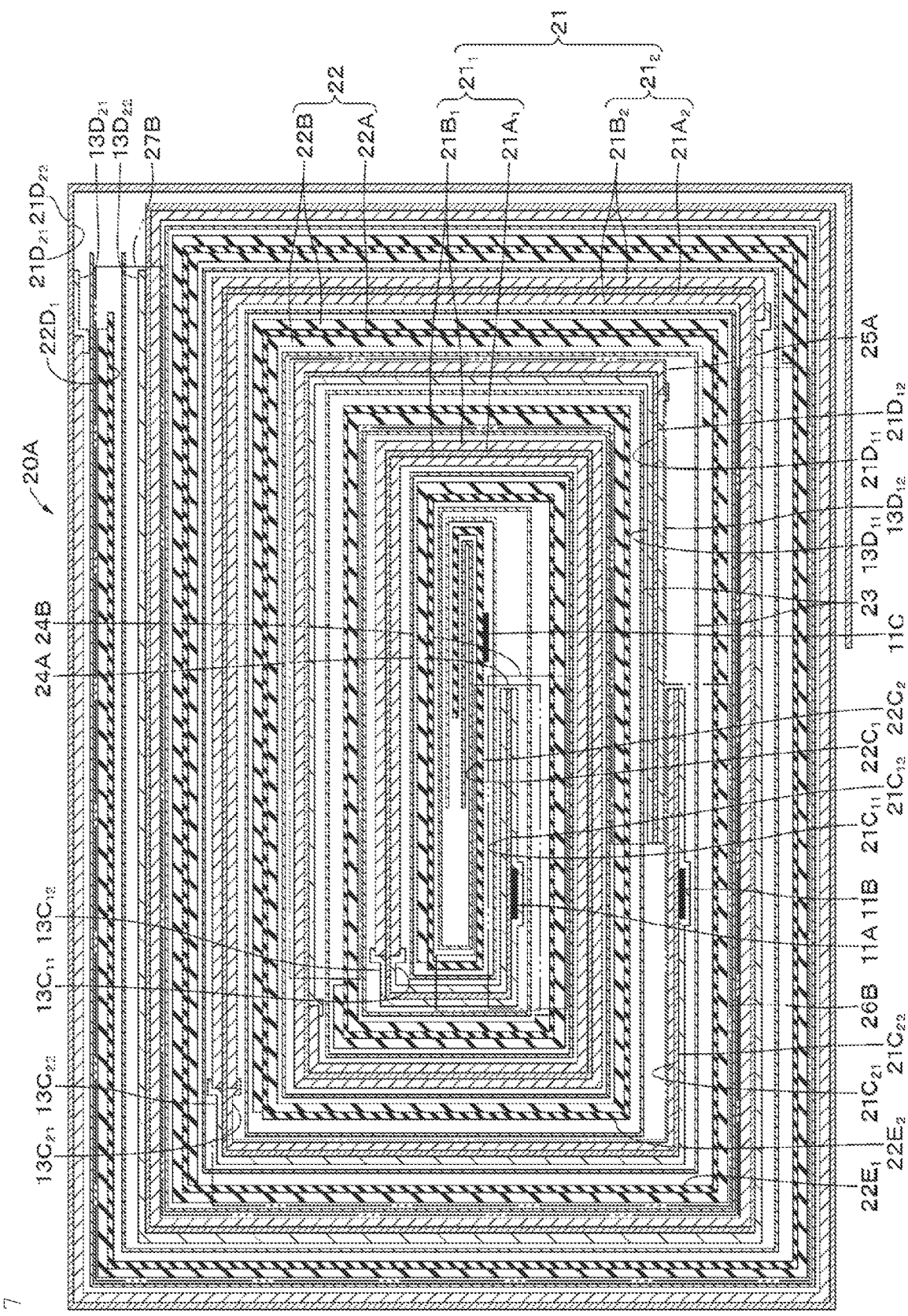
FIG. 7 shows a first variation of the electrode body according an embodiment of the present disclosure.

FIG. 7 shows a first variation of the electrode body 20A. The negative electrode active material layer 22B is not provided on the inner surface of the end portion on the outer peripheral side of the negative electrode 22, and a negative electrode current collector exposed portion $22D_1$ in which the inner surface of the negative electrode current collector 22A is exposed is provided. The negative electrode active material layer 22B is not provided on the outer peripheral surface of the end portion on the outer peripheral side of the negative electrode 22, and the negative electrode current collector 22A is not exposed. The positive electrode current collector exposed portion $21D_{22}$ on the outer peripheral side of the second positive electrode $21_2$ and the negative electrode current collector exposed portion $22D_1$ on the outer peripheral side of the negative electrode 22 configure a facing portion 27B facing each other with the separator 23 interposed therebetween.

Figure 8:
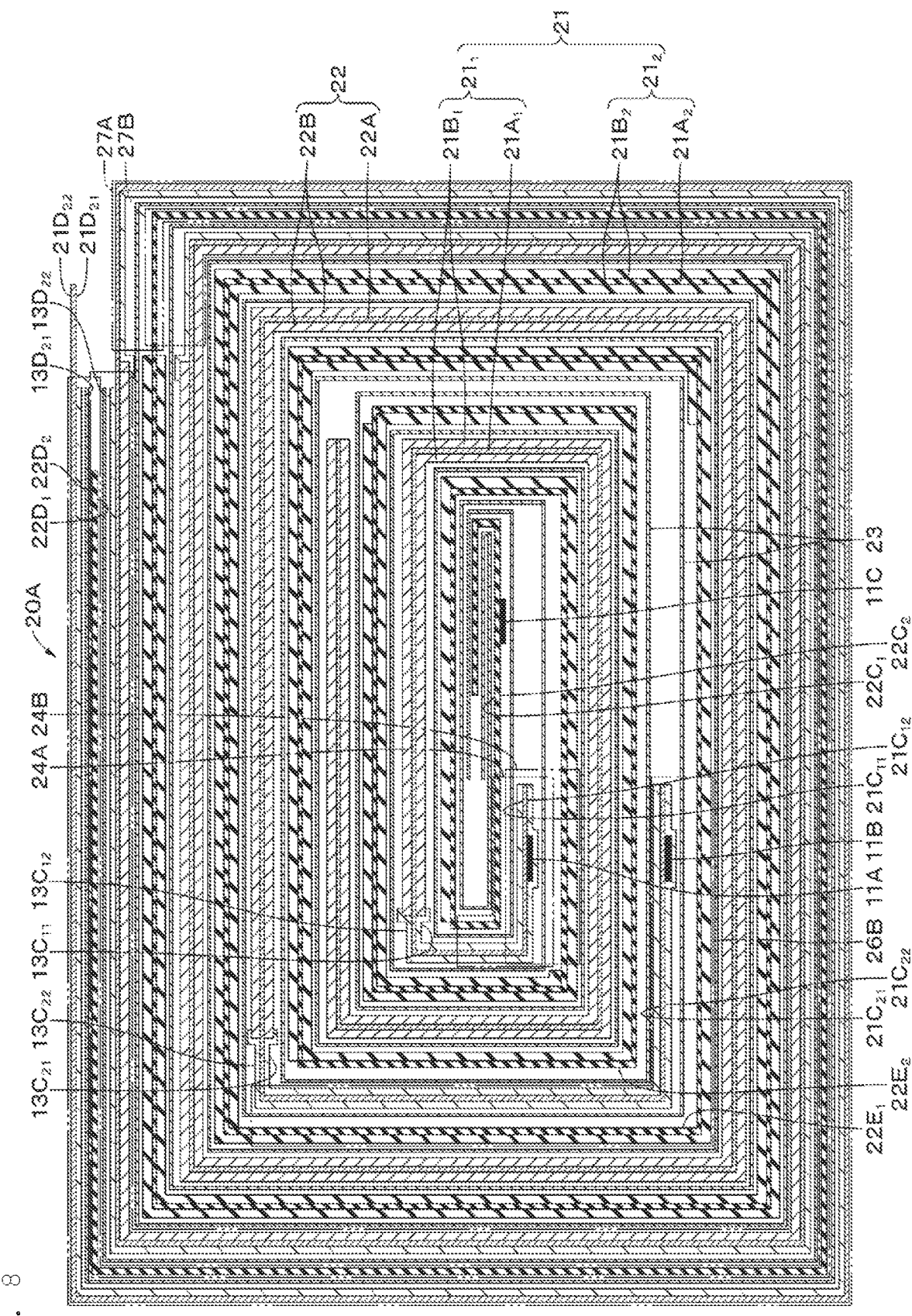
FIG. 8 shows a second variation of the electrode body according an embodiment of the present disclosure.

FIG. 8 shows a second variation of the electrode body 20A. The negative electrode active material layer 22B is not provided on the inner surface of the end portion on the outer peripheral side of the negative electrode 22, and a negative electrode current collector exposed portion $22D_1$ in which the inner surface of the negative electrode current collector 22A is exposed is provided. The negative electrode active material layer 22B is not provided on the outer surface of the end portion on the outer peripheral side of the negative electrode 22, and a negative electrode current collector exposed portion $22D_2$ in which the outer surface of the negative electrode current collector 22A is exposed is provided.

The positive electrode current collector exposed portion $21D_{21}$ on the outer peripheral side of the second positive electrode $21_2$ and the negative electrode current collector exposed portion $22D_2$ on the outer peripheral side of the negative electrode 22 configure a facing portion 27A facing each other with the separator 23 interposed therebetween. The positive electrode current collector exposed portion $21D_{22}$ on the outer peripheral side of the second positive electrode $21_2$ and the negative electrode current collector exposed portion $22D_1$ on the outer peripheral side of the negative electrode 22 configure a facing portion 27B facing each other with the separator 23 interposed therebetween.

The positive electrode active material layer $21B_1$ is provided on the inner and outer surfaces of the end portion on the outer peripheral side of the first positive electrode $21_1$, and the inner and outer surfaces of the positive electrode current collector $21A_1$ are not exposed.

In the above-described first and second variations, the facing portions 27A and 27B are provided over a range of preferably one quarter turn r more, more preferably half turn or more, still more preferably one turn or more, based on the top of the rewind portion of the facing portions 27A and 27B from the viewpoint of improving safety. The facing portions 27A and 27B are provided over a range of preferably two turns or less, more preferably one turn or less, based on the top of the folded portion of the facing portions 27A and 27B from the viewpoint of suppressing a decrease in energy density.

In the second embodiment, the case where the electrode body 20 has the facing portions 24, 25A, 26B, and 27A has been described, but the electrode body 20 may have at least one facing portion of the facing portions 24, 25A, 26B, and 27A.

From the viewpoint of improving safety, the electrode body 20 preferably has one or more and four or less facing portions of the facing portions 24, 25A, 26B, and 27A, more preferably has two or more and four or less facing portions of the facing portions 24, 25A, 26B, and 27A, still more preferably has three or more and four or less facing portions of the facing portions 24, 25A, 26B, and 27A, and particularly preferably has all the four facing portions of the facing portions 24, 25A, 26B, and 27A.

In the second embodiment, the case where the facing portions 24A and 24B are provided on the inner surface and the outer surface on the inner peripheral side of the first positive electrode $21_1$, respectively, has been described, but one of the facing portions 24A and 24B may be provided. In addition, in the second embodiment, the case where the facing portion 25A is provided on the inner surface on the outer peripheral side of the first positive electrode $21_1$ has been described, but the facing portion may be provided on the outer surface on the outer peripheral side of the first positive electrode $21_1$ or the facing portions may be provided on the inner surface and the outer surface on the outer peripheral side of the first positive electrode $21_1$, respectively.

In the second embodiment, the case where the facing portion 26B is provided on the outer surface on the inner peripheral side of the second positive electrode $21_2$ has been described, but the facing portion may be provided on the inner surface on the inner peripheral side of the second positive electrode $21_2$ or the facing portions may be provided on the inner surface and the outer surface on the inner peripheral side of the second positive electrode $21_2$, respectively. In addition, in the second embodiment, the case where the facing portion 27A is provided on the inner surface on the outer peripheral side of the second positive electrode $21_2$ has been described, but the facing portion may be provided on the outer surface on the outer peripheral side of the second positive electrode $21_2$ or the facing portions may be provided on the inner surface and the outer surface on the outer peripheral side of the second positive electrode $21_2$, respectively.

The facing portion where the positive electrode current collector exposed portion and the negative electrode current collector exposed portion face each other may be provided at a portion other than both end portions of the first positive electrode $21_1$ (that is, a middle peripheral portion), or may be provided at a portion other than both end portions of the second positive electrode $21_2$ (that is, a middle peripheral portion).

From the viewpoint of improving safety, the facing portion where the positive electrode current collector exposed portion and the negative electrode current collector exposed portion face each other is preferably provided on at least one of the inner peripheral side and the outer peripheral side of at least one electrode of the first and second positive electrodes $21_1$ and $21_2$, more preferably on the outer peripheral side of at least one electrode of the first and second positive electrodes $21_1$ and $21_2$, and still more preferably on the outer peripheral side of the first and second positive electrodes $21_1$ and $21_2$. In addition, from the viewpoint of improving safety, the facing portion is preferably provided on the outer peripheral side of the second positive electrode $21_2$ located on the outer peripheral side of the first and second positive electrodes $21_1$ and $21_2$.

The positive electrode 21 may be divided into two or more electrodes, and in this case, from the viewpoint of improving safety, the facing portion where the positive electrode current collector exposed portion and the negative electrode current collector exposed portion face each other is preferably provided on at least one of the inner peripheral side and the outer peripheral side of at least one electrode of the divided electrodes, more preferably on the outer peripheral side of at least one electrode of the divided electrodes, and still more preferably on the outer peripheral side of all the divided electrodes. In addition, from the viewpoint of improving safety, the facing portion is preferably provided on the outer peripheral side of the outermost electrode of the divided electrodes.

In Application Example 1, a battery pack and an electronic apparatus that include the battery according to the first or second embodiment will be described.

Figure 9:
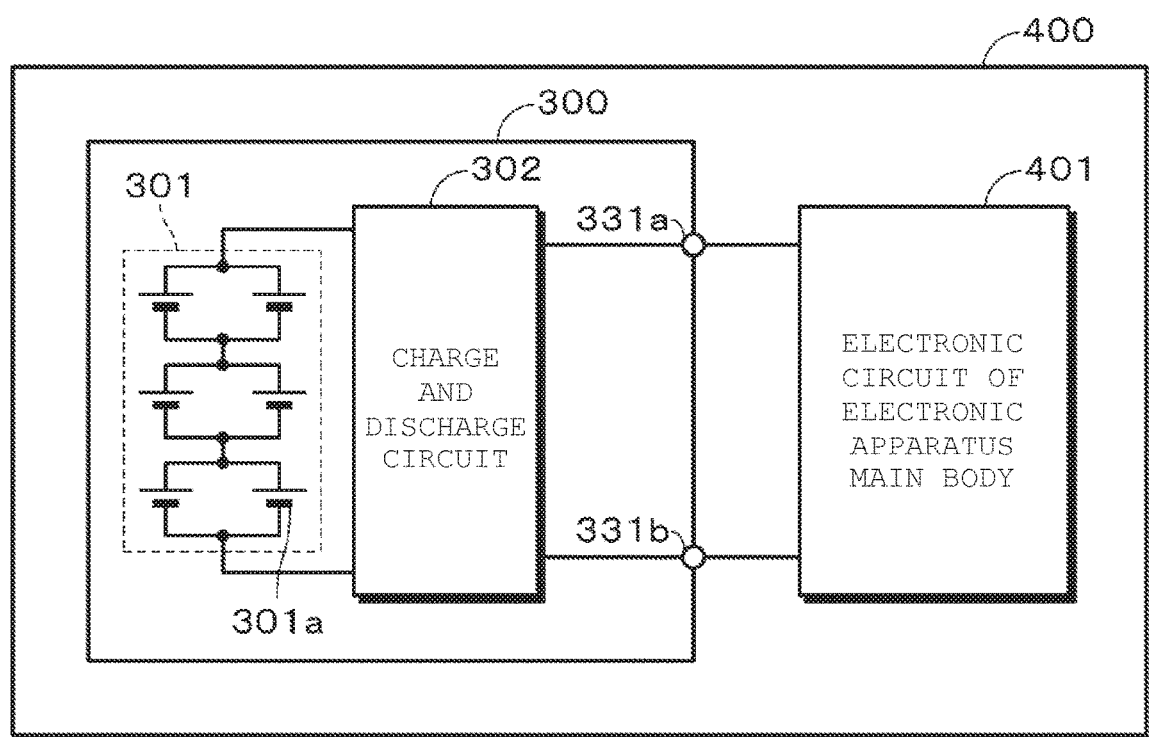
FIG. 9 is a block diagram showing an example of a configuration of an electronic apparatus as an application example.

Hereinafter, a configuration example of a battery pack 300 and an electronic apparatus 400 as an application example will be described with reference to FIG. 9. The electronic apparatus 400 includes an electronic circuit 401 of the electronic apparatus main body and the battery pack 300. The battery pack 300 is electrically connected to the electronic circuit 401 via a positive electrode terminal 331a and a negative electrode terminal 331b. The electronic apparatus 400 has, for example, a configuration in which a user can attach and detach the battery pack 300. Note that the configuration of the electronic apparatus 400 is not limited thereto, and it may have a configuration in which the battery pack 300 is built in the electronic apparatus 400 so that the user cannot remove the battery pack 300 from the electronic apparatus 400.

When the battery pack 300 is charged, the positive electrode terminal 331a and the negative electrode terminal 331b of the battery pack 300 are connected to the positive electrode terminal and the negative electrode terminal of a charger (not shown), respectively. On the other hand, when the battery pack 300 is discharged (when the electronic apparatus 400 is used), the positive electrode terminal 331a and the negative electrode terminal 331b of the battery pack 300 are connected to the positive electrode terminal and the negative electrode terminal of the electronic circuit 401, respectively.

Examples of the electronic apparatus 400 include notebook personal computers, tablet computers, mobile phones (for example, smart phones, etc.), portable information terminals (personal digital assistants (PDA)), display devices (LCDs, EL displays, electronic paper, etc.), imaging devices (for example, digital still cameras, digital video cameras, etc.), audio equipment (e.g., portable audio players), game equipment, cordless phone handsets, e-books, electronic dictionaries, radios, headphones, navigation systems, memory cards, pacemakers, hearing aids, power tools, electric shavers, refrigerators, air conditioners, televisions, stereos, water heaters, microwave ovens, dishwashers, washing machines, dryers, lighting equipment, toys, medical equipment, robots, road conditioners, traffic lights, and the like, but are not limited thereto.

The electronic circuit 401 includes, for example, a CPU, a peripheral logic unit, an interface unit, a storage unit, and the like, and controls the entire electronic apparatus 400.

The battery pack 300 includes an assembled battery 301 and a charge and discharge circuit 302. The assembled battery 301 is made of connecting a plurality of secondary batteries 301a in series and/or in parallel. The plurality of secondary batteries 301a are connected in, for example, n parallel and m series (n and m are positive integers). It should be understood that FIG. 9 shows an example in which six secondary batteries 301a are connected in two parallel and three series (2P3S). As the secondary battery 301a, the battery according to the first or second embodiment is used.

As the secondary battery 301a, the battery according to a battery according to the variation of the first or second embodiment may be used.

Here, a case in which the battery pack 300 includes the assembled battery 301 made of the plurality of secondary batteries 301a will be described, but such a configuration that the battery pack 300 includes a single secondary battery 301a instead of the assembled battery 301 may be adopted.

The charge and discharge circuit 302 is a control unit (controller) that controls charging and discharging of the assembled battery 301. Specifically, at the time of charging, the charge and discharge circuit 302 controls charging of the assembled battery 301. On the other hand, at the time of discharging (that is, at the time of using the electronic apparatus 400), the charge and discharge circuit 302 controls discharging to the electronic apparatus 400.

Figure 10:
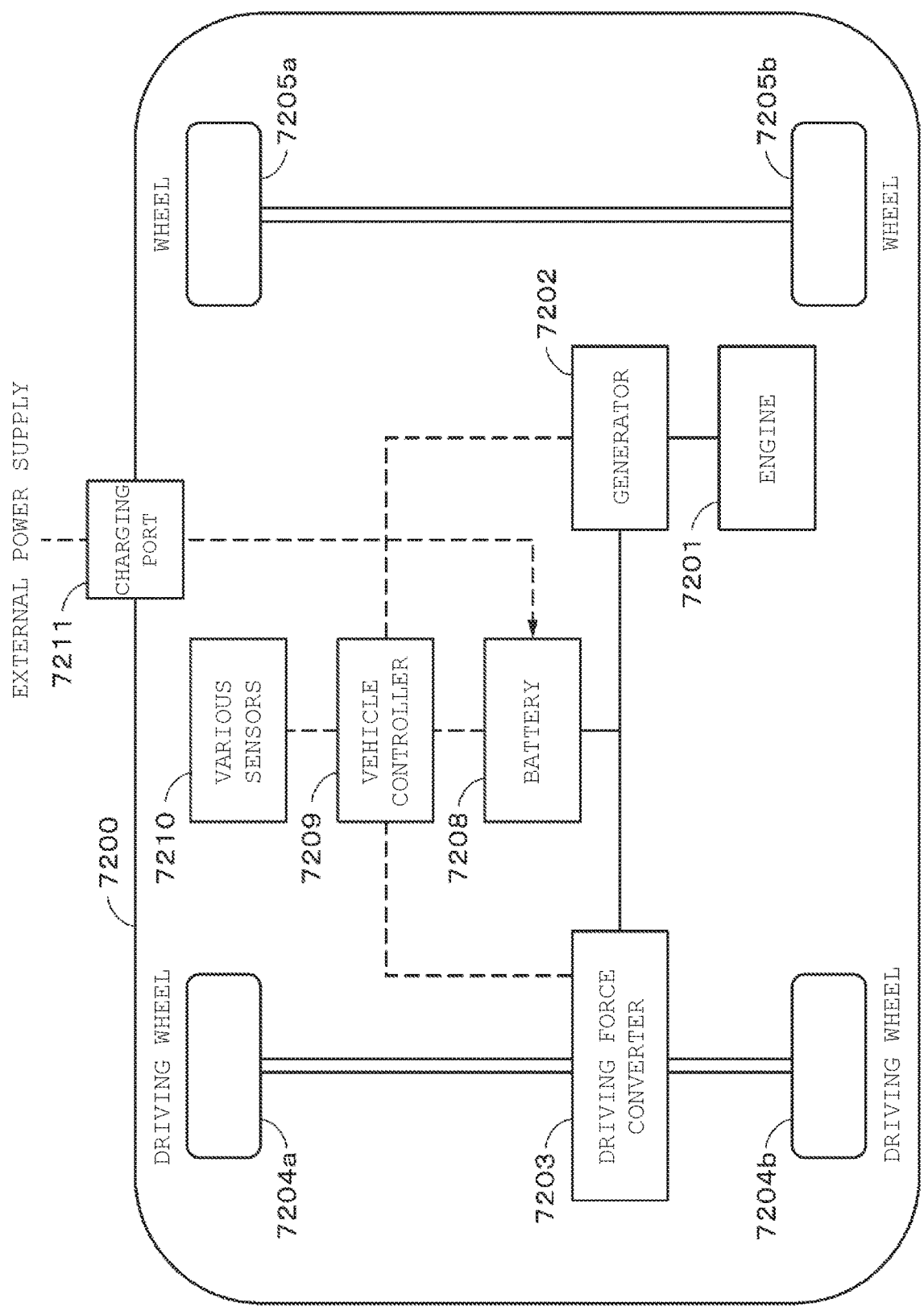
FIG. 10 is a schematic diagram showing an example of a configuration of a vehicle as an application example according an embodiment of the present disclosure.

An example in which the present disclosure is applied to a power storage system for a vehicle will be described with reference to FIG. 10. FIG. 10 schematically shows an example of a configuration of a hybrid vehicle that employs a series hybrid system to which the present disclosure is applied. A series hybrid system is a vehicle that runs on an electric power driving force converter using electric power generated by a generator driven by an engine or electric power once stored in a battery.

In a hybrid vehicle 7200, an engine 7201, a generator 7202, an electric power driving force converter 7203, a driving wheel 7204a, a driving wheel 7204b, a wheel 7205a, a wheel 7205b, a battery 7208, a vehicle controller 7209, various sensors 7210, and a charging port 7211 are installed. The above-described power storage device of the present disclosure is applied to the battery 7208.

The hybrid vehicle 7200 runs using the electric power driving force converter 7203 as a power source. An example of the electric power driving force converter 7203 is a motor. The electric power driving force converter 7203 is operated by the electric power of the battery 7208, and the torque of the electric power driving force converter 7203 is transmitted to the driving wheels 7204a and 7204b. Note that by using direct current-alternate current (DC-AC) or inverse conversion (AC-DC conversion) in necessary places, the electric power driving force converter 7203 can be applied to either an AC motor or a DC motor. The various sensors 7210 control the engine speed via the vehicle controller 7209 and control the opening of a throttle valve (throttle opening) (not shown). The various sensors 7210 include a speed sensor, an acceleration sensor, an engine speed sensor, and the like.

The torque of the engine 7201 is transmitted to the generator 7202, and the power generated by the generator 7202 by the torque can be stored in the battery 7208.

When the hybrid vehicle is decelerated by a braking mechanism (not shown), a resistance force at the time of the deceleration is applied as a torque to the electric power driving force converter 7203, and the regenerative electric power generated by the electric power driving force converter 7203 by this torque is stored to the battery 7208.

When the battery 7208 is connected to a power supply external to the hybrid vehicle, the battery 7208 can receive power supply from the external power supply using the charging port 7211 as an input port, and can store the received power.

Although not shown, an information processing device that performs information processing on vehicle control based on information on the secondary battery may be provided. As such an information processing device, for example, there is an information processing device that displays the remaining battery level based on information regarding the remaining battery level.

It should be understood that the above description has been given by taking as an example a series hybrid vehicle driven by a motor using electric power generated by a generator driven by an engine or electric power once stored in a battery. However, the present disclosure is also effectively applied to a parallel hybrid vehicle in which the output of the engine and the motor are both driving sources, and the three types of driving only with the engine, driving only with the motor, and driving with the engine and the motor are appropriately switched and used. Furthermore, the present disclosure can be effectively applied to a so-called electric vehicle that travels only by a driving motor without using an engine.

The example of the hybrid vehicle 7200 to which the technology according to the present disclosure can be applied has been described above. The technology according to the present disclosure can be suitably applied to the battery 7208 among the configurations described above.

Figure 11:
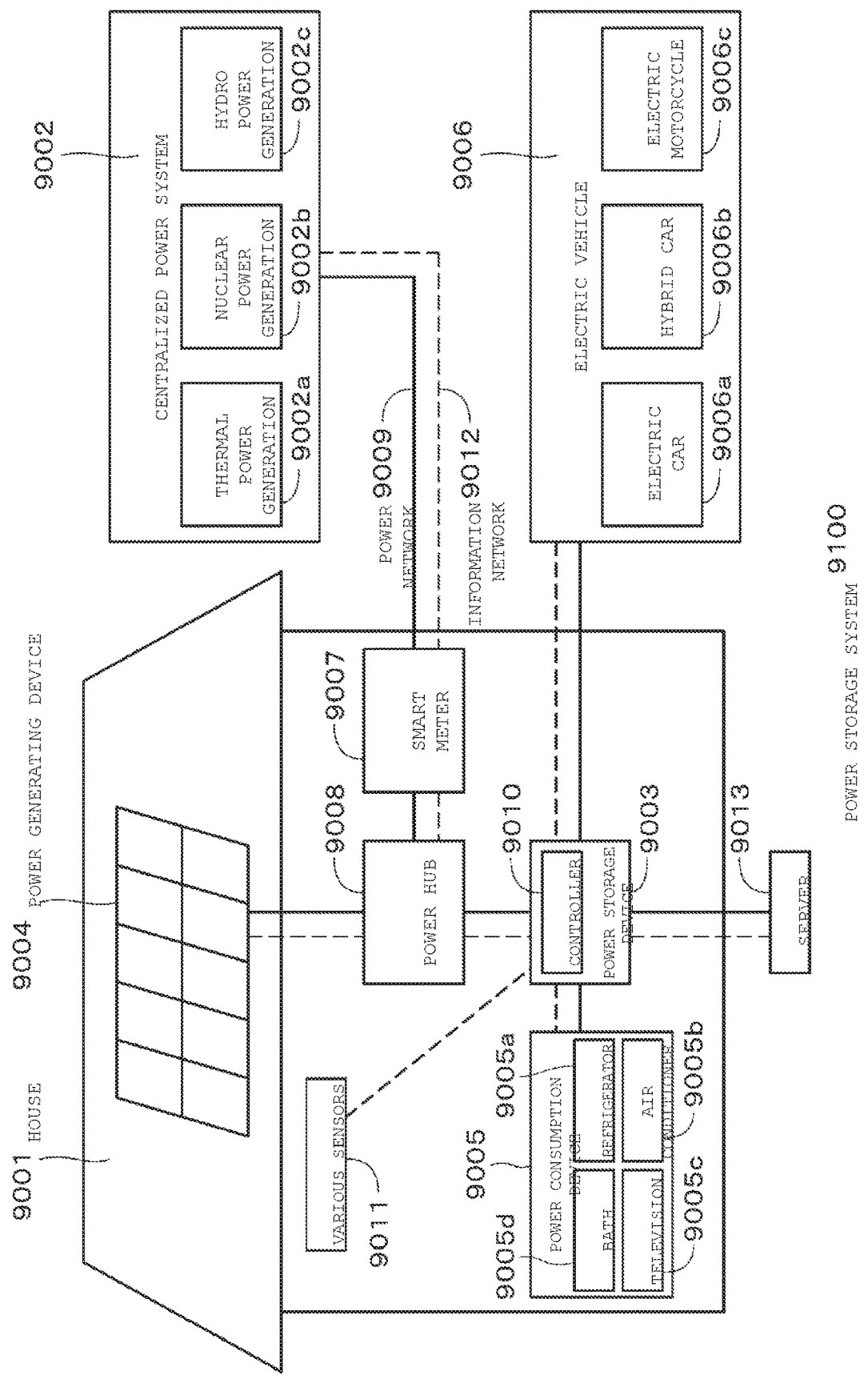
FIG. 11 is a schematic diagram showing an example of a configuration of a power storage system as an application example according an embodiment of the present disclosure.

An example in which the present disclosure is applied to a power storage system for a house will be described with reference to FIG. 11. For example, in a power storage system 9100 for a house 9001, power is supplied from a centralized power system 9002, such as a thermal power generation 9002a, a nuclear power generation 9002b and a hydro power generation 9002c to a power storage device 9003 via a power network 9009, an information network 9012, a smart meter 9007, a power hub 9008, and the like. In addition, power is supplied to the power storage device 9003 from an independent power supply such as an in-house power generating device 9004. The power supplied to the power storage device 9003 is stored. Using the power storage device 9003, power used in the house 9001 is supplied. A similar power storage system can be used not only for the house 9001 but also for a building.

The house 9001 is provided with the power generating device 9004, a power consumption device 9005, the power storage device 9003, a controller 9010 for controlling each device, the smart meter 9007, and a sensor 9011 for acquiring various information. Each device is connected by the power network 9009 and the information network 9012. As the power generating device 9004, a solar cell, a fuel cell, or the like is used, and the generated power is supplied to the power consumption device 9005 and/or the power storage device 9003. The power consumption device 9005 is a refrigerator 9005a, an air conditioner 9005b, a television receiver 9005c, a bath 9005d, or the like. Furthermore, the power consumption device 9005 includes an electric vehicle 9006. The electric vehicle 9006 is an electric car 9006a, a hybrid car 9006b, or an electric motorcycle 9006c.

The battery unit of the present disclosure described above is applied to the power storage device 9003. The power storage device 9003 is configured by a secondary battery or a capacitor.

For example, it is made of a lithium ion battery. The lithium ion battery may be a stationary type or a type used in the electric vehicle 9006. The smart meter 9007 has a function of measuring the usage of commercial power and transmitting the measured usage to a power company. The power network 9009 may be one of DC power supply, AC power supply, and non-contact power supply, or a combination thereof.

The various sensors 9011 are, for example, a human sensor, an illuminance sensor, an object detection sensor, a power consumption sensor, a vibration sensor, a contact sensor, a temperature sensor, an infrared sensor, and the like information obtained by the various sensors 9011 is transmitted to the controller 9010. Based on the information from the sensors 9011, the state of the weather, the state of a person, and the like can be grasped to control the power consumption device 9005 automatically to minimize energy consumption. Furthermore, the controller 9010 can transmit information on the house 9001 to an external power company or the like via the Internet.

The power hub 9008 performs processing such as power line branching and DC/AC conversion. Examples of a communication method of the information network 9012 connected to the controller 9010 include a method using a communication interface such as universal asynchronous receiver-transmitter (UART) (transmitting and receiving circuit for asynchronous serial communication), and a method using a sensor network based on wireless communication standards such as Bluetooth (registered trademark), ZigBee (registered trademark), and Wi-Fi. The Bluetooth (registered trademark) method is applied to multimedia communication, and can perform one-to-many connection communication. The ZigBee (registered trademark) uses a physical layer of institute of electrical and electronics engineers (IEEE) 802.15.4. IEEE 802.15.4 is the name of a short-range wireless network standard called personal area network (PAN) or wireless (W) PAN.

The controller 9010 is connected to an external server 9013. This server 9013 may be managed by any of the house 9001, a power company, and a service provider. The information transmitted and received by the server 9013 is, for example, power consumption information, life pattern information, power rates, weather information, natural disaster information, and information on power transactions. These pieces of information may be transmitted and received from a home power consumption device (for example, a television receiver), or may be transmitted and received from a device outside the home (for example, a mobile phone and the like). These pieces of information may be displayed on a device having a display function, for example, a television receiver, a mobile phone, personal digital assistants (PDA), or the like.

The controller 9010 that controls each unit includes a central processing unit (CPU), a random access memory (RAM), a read only memory (ROM), and the like, and is stored in the power storage device 9003 in this example. The controller 9010 is connected to the power storage device 9003, the in-house power generating device 9004, the power consumption device 9005, the various sensors 9011, the server 9013, and the information network 9012, and has a function to adjust, for example, the amount of commercial power used and the amount of power generation. Note that in addition, a function for performing power transaction in a power market may be provided.

As described above, not only power in the centralized power system 9002 such as the thermal power 9002a, the nuclear power 9002b, and the hydro power 9002c but also power generated by the in-house power generating device 9004 (photovoltaic power generation, wind power generation) can be stored in the power storage device 9003.

Therefore, even if the power generated by the in-house power generating device 9004 fluctuates, control can be performed such that the amount of power transmitted to the outside is kept constant, or the power is discharged as needed. For example, it can also be used that the power obtained by the photovoltaic power generation is stored in the power storage device 9003, the late-night power at a low rate during the night is stored in the power storage device 9003, and the power stored by the power storage device 9003 is discharged during the time when the daytime rate is high.

It should be understood that, in this example, the example in which the controller 9010 is stored in the power storage device 9003 has been described, but the controller 9010 may be stored in the smart meter 9007, or may be configured independently. Furthermore, the power storage system 9100 may be used for a plurality of homes in an apartment house, or may be used for a plurality of detached houses.

An example of the power storage system 9100 to which the technology according to the present disclosure can be applied has been described above. The technology according to the present disclosure can be suitably applied to the secondary battery included in the power storage device 9003 among the configurations described above.

EXAMPLES

Hereinafter, the present disclosure be specifically described with reference to Examples, but the present disclosure is not limited to only these Examples.

In the following Examples and Comparative Examples, a "foil-foil facing portion" refers to one provided over a range of one quarter turn or more, based on the top of the rewind portion of the facing portions in which an aluminum foil (positive electrode current collector) exposed without being covered by the positive electrode active material layer and a copper foil (negative electrode current collector) exposed without being covered by the negative electrode active material layer face to each other with the separator interposed therebetween.

Example 1

An inner peripheral side positive electrode (first positive electrode) was produced as follows. First, 96 parts by mass of a lithium-cobalt composite oxide (LiCoO$_2$) as a positive electrode active material, 3 parts by mass of polyvinylidene fluoride as a binder, and 1 part by mass of carbon black as a positive electrode conductive agent were mixed to prepare a positive electrode mixture. Next, the positive electrode mixture was dispersed in N-methyl-2-pyrrolidone as an organic solvent to obtain a paste-like positive electrode mixture slurry. Subsequently, after the positive electrode mixture slurry was applied to both surfaces of a positive electrode current collector (a 12-μm-thick belt-like aluminum foil) using a coating device, the positive electrode mixture slurry was dried to form a positive electrode active material layer. At this time, as shown in FIG. 3 and Table 1, the application position of the positive electrode mixture slurry was adjusted so that the foil-foil facing portion was not formed at the end portions on the inner peripheral side and the outer peripheral side of the inner peripheral side positive electrode after winding.

Next, the positive electrode active material layer was compression-molded using a roll press to produce an inner peripheral side positive electrode having a belt shape. Finally, a positive electrode lead made of aluminum covered with a sealant material was welded to the positive electrode current collector exposed portion formed at e end portion which became on the inner peripheral side after the winding.

As shown in FIG. 3 and Table 1, the application position of the positive electrode mixture slurry was adjusted so that the foil-foil facing portion was not formed at the end portions on the inner peripheral side and the outer peripheral side of an outer peripheral side positive electrode after winding. Except for this, the outer peripheral side positive electrode (second positive electrode) was produced in the same manner as the inner peripheral side positive electrode.

A negative electrode was produced as follows. First, 90 parts by mass of graphite powder as a negative electrode active material and 10 parts by mass of polyvinylidene fluoride as a binder were mixed to prepare a negative electrode mixture. Next, the negative electrode mixture was dispersed in N-methyl-2-pyrrolidone as an organic solvent to prepare a paste-like negative electrode mixture slurry. Subsequently, after the negative electrode mixture slurry was applied to both surfaces of a negative electrode current collector (6-μm-thick belt-like electrolytic copper foil) using a coating device, the negative electrode mixture slurry was dried to form a negative electrode active material layer. At this time, as shown in FIG. 3 and Table 1, the application position of the negative electrode mixture slurry was adjusted so that the foil-foil facing portion was not formed at the end portions on the inner peripheral side and the outer peripheral side of the inner and outer peripheral positive electrodes after the winding. Next, the negative electrode active material layer was compression-molded using a roll press to produce a negative electrode having a belt shape. Finally, a negative electrode lead made of nickel covered with a sealant material was welded to the negative electrode current collector exposed portion formed at the end portion which became on the inner peripheral side after the winding.

The electrode body was produced as follows. First, after winding the inner peripheral side positive electrode and the negative electrode in the longitudinal direction with a separator (microporous polyethylene film having a thickness of 25 μm) interposed therebetween, an electrode body having a flat shape was produced by winding the outer peripheral side positive electrode and the negative electrode in the longitudinal direction with the separator interposed therebetween. At this time, the winding positions of the inner peripheral side positive electrode and the outer peripheral side positive electrode were adjusted such that the two positive electrode leads overlap in the thickness direction of the electrode body. Thereafter, a protective tape was attached to the outermost peripheral portion.

An electrolytic solution was prepared as follows. First, ethylene carbonate (EC), propylene carbonate (PC), and diethyl carbonate (DC) were mixed at a mass ratio of EC:PC:DC=15:15:70 to prepare a mixed solvent. Subsequently, in this mixed solvent, lithium hexafluorophosphate (LiPF$_6$) was dissolved as an electrolyte salt at a concentration of 1 mol/l to prepare an electrolytic solution.

First, a moisture-proof aluminum laminate film in which a nylon film having a thickness of 25 μm, an aluminum foil having a thickness of 40 μm, and a polypropylene film having a thickness of 30 μm were laminated in that order from the outermost layer was prepared as an exterior material. Next, one area that is bisected by the center position in the long side direction of the aluminum laminate film of the surfaces of the aluminum laminate film on the polypropylene film side is subjected to emboss molding to form an emboss molded portion as an accommodation space.

Subsequently, two positive electrode leads and one negative electrode lead were led out from the short side of the aluminum laminate film, the electrode body was accommodated in the emboss molded portion, and the aluminum laminate film was folded back with respect to the above center position to overlap each side. After that, two sides of the three sides of the overlapped aluminum laminate film are heat-sealed, one side is left as an opening without being heat-sealed, an electrolytic solution is injected from this opening, and then the remaining one side of the exterior material is heat-sealed under reduced pressure to seal the electrode body with a laminate film. Finally, the two positive electrode leads were electrically connected to each other outside of the exterior material by welding. As a result, a desired laminated battery was obtained.

Examples 2 to 15

As shown in Table 1, the application position of the positive electrode mixture slurry was adjusted in the production step of the inner peripheral side positive electrode and the outer peripheral side positive electrode and the application position of the negative electrode mixture slurry was adjusted in the production step of the negative electrode such that the foil-foil facing portion was formed or not formed on the inner peripheral side and the outer peripheral side of the inner and outer peripheral side positive electrodes after winding. Except for this, a battery was obtained in the same manner as in Example 1.

Example 16

As shown in FIG. 5 and Table 1, the application position of the positive electrode mixture slurry was adjusted in the production step of the inner peripheral side positive electrode and the outer peripheral side positive electrode and the application position of the negative electrode mixture slurry was adjusted in the production step of the negative electrode such that the foil-foil facing portion was formed on the inner peripheral side and the outer peripheral side of the inner and outer peripheral side positive electrodes after winding. Except for this, a battery was obtained in the same manner as the inner peripheral side positive electrode.

Example 17

A battery was obtained in the same manner as in Example 16, except that in the production step of the inner peripheral side positive electrode, a positive electrode lead was welded to the positive electrode current collector exposed portion formed at the end portion which became on the outer peripheral side after winding.

Example 18

A battery was obtained in the same manner as in Example 16, except that in the production step of the outer peripheral side positive electrode, a positive electrode lead was welded to the positive electrode current collector exposed portion formed at the end portion which became on the outer peripheral side after winding.

Example 19

A battery was obtained in the same manner as in Example 16, except that in the production step of the inner peripheral side positive electrode, a positive electrode lead was welded to the positive electrode current collector exposed portion formed at the end portion which became on the outer peripheral side after winding, and in the production step of the outer peripheral side positive electrode, a positive electrode lead was welded to the positive electrode current collector exposed portion formed at the end portion which became on the outer peripheral side after winding.

Example 20

A battery was obtained in the same manner as in Example 1 except that one undivided positive electrode was used as the positive electrode, and the divided inner negative electrode and outer negative electrode were used as the negative electrode.

Comparative Example 1

A battery was obtained in the same manner as in Example 1 except that the two positive electrode leads were electrically connected to each other inside the exterior material by welding.

Comparative Example 2

A battery was obtained in the same manner as in Example 1 except that one undivided positive electrode was used as the positive electrode. Note that the undivided positive electrode was obtained in the same manner as the first positive electrode of Example 1 except that the length was different.

Comparative Example 3

First, two electrode bodies having a flat shape were produced. Note that these electrode bodies were obtained in the same manner as the electrode body of Comparative Example 2 except that the number of turns was different. Next, a battery was obtained in the same manner as in Example 1 except that the two electrode bodies were accommodated in a laminate film and sealed so as to be overlapped.

Comparative Examples 4 to 6

As shown in Table 1, the application position of the positive electrode mixture slurry was adjusted in the production step of the positive electrode and the application position of the negative electrode mixture slurry was adjusted in the production step of the negative electrode such that the foil-foil facing portion was formed or not formed at the end portions on the inner peripheral side and the outer peripheral side after winding. Except for this, a battery was obtained in the same manner as in Comparative Example 2.

First, in a 23° C. environment, the battery was charged at a constant current of 0.2 C until the battery voltage reached 4.40 V, and then the battery was charged at a constant voltage of 4.40 V until the current value reached 0.01 C. Next, the discharge capacity was determined by discharging the battery at a constant current of 0.2 C until the battery voltage reached 3.0 V Subsequently, the volume energy density was determined using the determined discharge capacity.

Using a Battery HiTESTER BT3562 manufactured by HIOKI E. E. CORPORATION, a needle-shaped measurement ter al is brought into contact with a portion near the seal portion on the top side of the positive and negative electrode leads coming out of the exterior material to measure the resistance value for 1 kHz AC current, and the value was defined as the "resistance" of the battery. Note that when two electrode leads (positive electrode lead or negative electrode lead) are put out of the exterior material in a laminated state, the resistance value may differ depending on which of the electrode leads facing the side and opposing side on which the exterior material is embossed the measurement terminal is applied to. For this reason, when the resistance is measured described above, the measurement terminal was brought into contact with the electrode lead facing the side on which the exterior material was embossed.

First, in a 23° C. environment, the battery was charged at a constant current of 0.2 C until the battery voltage reached 4.40 V, and then the battery was charged at a constant voltage of 4.40 V until the current value reached 0.01 C. Next, a nail was pierced from the center of the embossed surface of the charged battery at a speed of 100 mm/sec in the thickness direction of the battery. As the nail, an iron nail having a diameter of 2.5 mm was used. When the battery did not thermally run away in the nail penetration test, a new battery was prepared and charged in the same manner as described above except that the charging voltage was increased by 0.05 V, and then, the nail penetration test was performed again. Conversely, when the battery thermally ran away, the same test as above was performed except that the charging voltage was reduced by 0.05V. By repeating the above procedure, the upper limit value of the charging voltage at which the battery did not thermally run away was determined by the nail penetration test.

<0.5 mm Nail Penetration from the Surface>

In the same manner as in the case of "piercing nail penetration" described above except that the charged battery was subjected to a nail penetration test in which a nail was pierced from one main surface to a depth of 0.5 mm, the upper limit value of the charging voltage at which the battery did not thermally run away was determined by the nail penetration test.

Table 1 shows the configurations and evaluation results of the batteries of Examples 1 to 20 and Comparative Example 1.

TABLE 1

| | Foil-foil facing portion | | | | Positive electrode lead arrangement position | | Energy density h/L | Resistance (mΩ) | Nail penetration upper limit voltage (V) Nail penetrating method | | Others |
|---|---|---|---|---|---|---|---|---|---|---|---|
| | Inner peripheral side electrode | | Outer peripheral side electrode | | | | | | | | |
| | Inner peripheral side | Outer peripheral side | Inner peripheral side | Outer peripheral side | Inner peripheral electrode | Outer peripheral electrode | | | Piercing | 0.5 mm from surface | |
| Example 1 | × | × | × | × | Inner peripheral side | Inner peripheral side | 666 | 22.0 | 4.20 | — | Positive electrode is divided |
| Example 2 | ○ | × | × | × | Inner peripheral side | Inner peripheral side | 666 | 22.0 | 4.25 | — | Positive electrode current collecting leads are connected to each other outside exterior material |
| Example 3 | x | ○ | × | × | Inner peripheral side | Inner peripheral side | 663 | 22.0 | 4.30 | — | |
| Example 4 | × | × | ○ | × | Inner peripheral side | Inner peripheral side | 666 | 22.0 | 4.25 | — | |
| Example 5 | × | × | × | ○ | Inner peripheral side | Inner peripheral side | 663 | 22.0 | 4.30 | — | |
| Example 6 | ○ | ○ | × | × | Inner peripheral side | Inner peripheral side | 663 | 22.0 | 4.35 | — | |
| Example 7 | ○ | × | ○ | × | Inner peripheral side | Inner peripheral side | 666 | 22.0 | 4.30 | 4.25 | |
| Example 8 | ○ | × | × | ○ | Inner peripheral side | Inner peripheral side | 663 | 22.0 | 4.35 | — | |
| Example 9 | × | ○ | ○ | × | Inner peripheral side | Inner peripheral side | 663 | 22.0 | 4.35 | — | |
| Example 10 | × | ○ | × | ○ | Inner peripheral side | Inner peripheral side | 660 | 22.0 | 4.40 | — | |
| Example 11 | × | × | ○ | ○ | Inner peripheral side | Inner peripheral side | 663 | 22.0 | 4.35 | — | |
| Example 12 | ○ | ○ | ○ | × | Inner peripheral side | Inner peripheral side | 663 | 22.0 | 4.40 | — | |
| Example 13 | ○ | ○ | × | ○ | Inner peripheral side | Inner peripheral side | 660 | 22.0 | 4.45 | — | |
| Example 14 | ○ | × | ○ | ○ | Inner peripheral side | Inner peripheral side | 663 | 22.0 | 4.40 | 4.40 | |
| Example 15 | × | ○ | ○ | ○ | Inner peripheral side | Inner peripheral side | 660 | 22.0 | 4.45 | — | |
| Example 16 | ○ | ○ | ○ | ○ | Inner peripheral side | Inner peripheral side | 660 | 22.0 | 4.50 | 4.40 | |
| Example 17 | ○ | ○ | ○ | ○ | Outer peripheral side | Inner peripheral side | 660 | 22.0 | 4.50 | — | |
| Example 18 | ○ | ○ | ○ | ○ | Inner peripheral side | Outer peripheral side | 660 | 22.0 | 4.45 | — | |
| Example 19 | ○ | ○ | ○ | ○ | Outer peripheral side | Outer peripheral side | 660 | 22.0 | 4.45 | — | |
| Example 20 | × | × | × | × | Inner peripheral side | Inner peripheral side | 658 | 23.0 | 4.20 | — | Negative electrode is divided Negative electrode current collecting leads are connected to each other outside exterior material |

TABLE 1-continued

| | Foil-foil facing portion | | | | Positive electrode lead arrangement position | | | | Nail penetration upper limit voltage (V) Nail penetrating method | | |
|---|---|---|---|---|---|---|---|---|---|---|---|
| | Inner peripheral side electrode | | Outer peripheral side electrode | | | | | | | | |
| | Inner peripheral side | Outer peripheral side | Inner peripheral side | Outer peripheral side | Inner peripheral electrode | Outer peripheral electrode | Energy density h/L | Resistance (mΩ) | Piercing | 0.5 mm from surface | Others |
| Comparative Example 1 | × | × | × | × | Inner peripheral side | Inner peripheral side | 640 | 23.2 | 4.05 | — | Positive electrode is divided Positive electrode current collecting leads are connected to each other inside exterior material |

Table 2 shows the configurations and evaluation results of the batteries of Comparative Examples 2 to 6.

TABLE 2

| | Foil-foil facing portion | | Positive electrode lead arrangement position | | | Nail penetration upper limit voltage (V) Nail penetrating method | | |
|---|---|---|---|---|---|---|---|---|
| | Inner peripheral side | Outer peripheral side | | Energy density (Wh/L) | Resistance (mΩ) | Piercing | 0.5 mm from surface | Others |
| Comparative Example 2 | × | × | Inner peripheral side | 680 | 27.0 | 3.95 | — | |
| Comparative Example 3 | × | × | Inner peripheral side | 650 | 20.0 | 4.30 | — | Laminated structure of two wound bodies |
| Comparative Example 4 | × | ○ | Inner peripheral side | 666 | 27.0 | 4.30 | — | |
| Comparative Example 5 | ○ | × | Inner peripheral side | 680 | 27.0 | 4.15 | 3.80 | |
| Comparative Example 6 | ○ | ○ | Inner peripheral side | 666 | 27.0 | 4.35 | 4.20 | |

It should be understood that in Tables 1 and 2, the symbol "○" indicates the configuration with the foil-foil facing portion, and the symbol "×" indicates the configuration without the foil-foil facing portion.

Figure 12A:
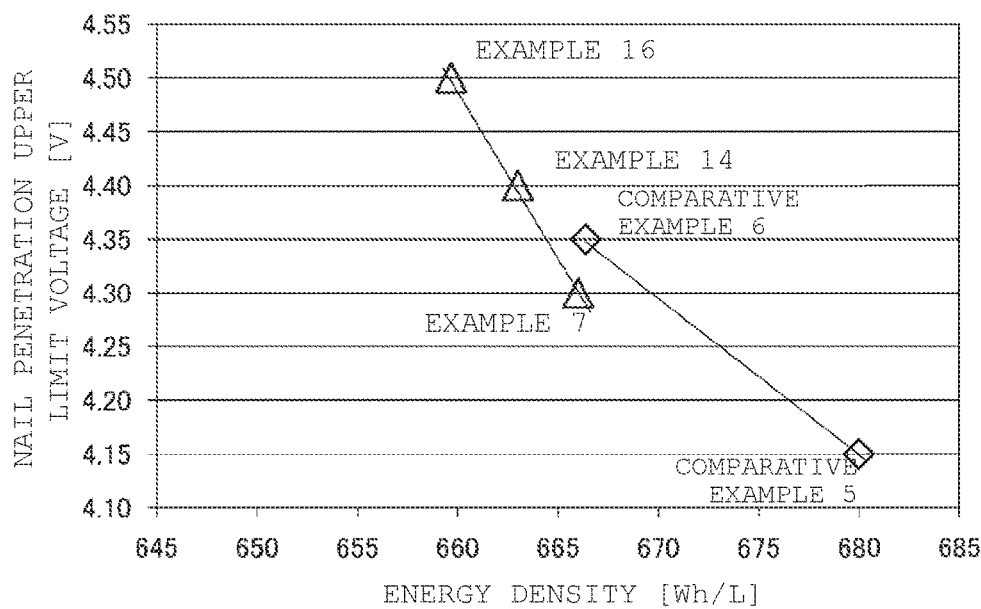
FIG. 12A is a graph showing a relationship between the energy density of each battery and safety when a nail is penetrated.

It is known that the safety is improved by providing the foil-foil facing portion on the outer peripheral side of the battery (for example, see Japanese Patent Application Laid-Open No. 2013-16265, Japanese Patent Application Laid-Open No. 11-176478), but when such a structure that the electrode is divided is adopted, it has been found that the effect is more remarkably exhibited. FIG. 12A is a plot obtained by selecting the evaluation results of the cases where the number of foil-foil facing portions is different among the evaluation results of a battery having a structure in which the electrodes are not divided (hereinafter simply referred to as "non-divided structure") and a battery having a structure in which the electrodes are divided (hereinafter simply referred to as "divided structure"). It is found from FIG. 12A that the effect of providing the foil-foil facing portion is more remarkably exhibited in the battery having the divided structure than in the battery having the non-divided structure.

It is presumed that the above-mentioned effects are exhibited for the following reasons. When the foil-foil facing portion is arranged at the end portion on the outer peripheral side in the battery having a non-divided structure, the current flowing into the short-circuit portion increases, but the heat generation amount decreases because the resistance itself is small. On the other hand, when the foil-foil facing portion is arranged at the end portion on the outer peripheral side of the outer peripheral side electrode in the battery having a non-divided structure, there is an effect of reducing the short-circuit current itself while taking advantage of the effect of reducing the resistance of the short-circuit portion due to the arrangement of the foil-foil facing portion, and thus a synergistic effect is generated with the arrangement of the foil-foil facing portion. Therefore, safety can be improved.

From the evaluation results of Table 1, it is found that the number of foil-foil facing portions is preferably 1 or more, more preferably 2 or more, still more preferably 3 or more, particularly preferably 4 from the viewpoint of improving safety. In addition, it is found that, from the viewpoint of improving safety, it is preferable that one of the inner peripheral side electrode and the outer peripheral side electrode has a foil-foil facing portion at the end portion on the outer peripheral side, and it is more preferable that both of the inner peripheral side electrode and the outer peripheral side electrode have a foil-foil facing portion at the end portion on the outer peripheral side.

Figure 12B:
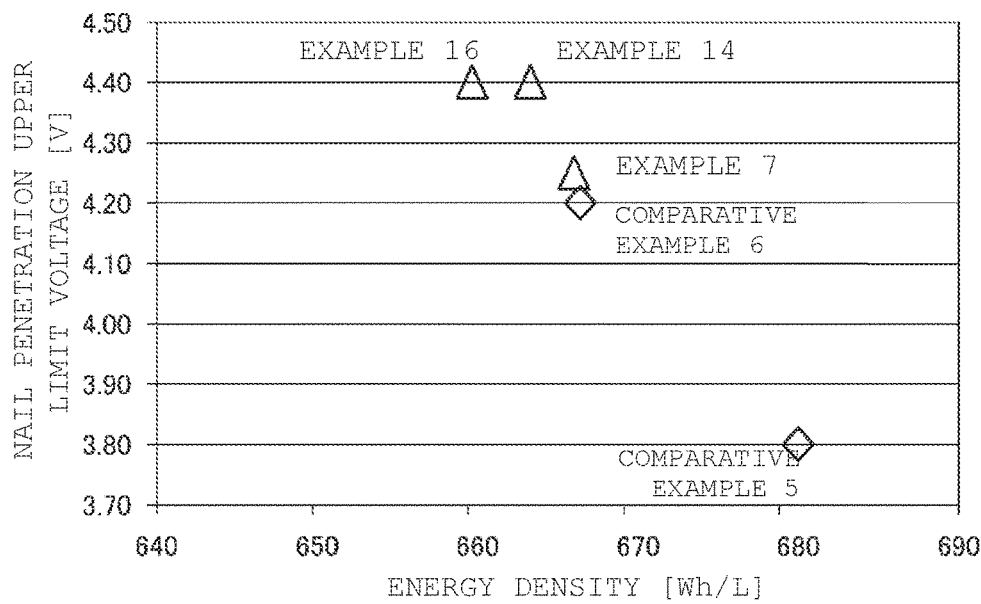
FIG. 12B is a graph showing the relationship between the energy density of each battery and the safety when a nail is pierced by 0.5 mm from the surface according an embodiment of the present disclosure.

However, it is clear that, even if the foil-foil facing portion is not at the end portion on the outer peripheral side, when the evaluation of piercing the nail shallowly is performed, the battery having the divided structure has an advantage compared to the battery having the non-divided structure (see FIG. 12B). Since the mode in which the battery is shallowly scratched from the outside of the battery is considered to be a frequent event in the actual use environment of the battery, it is considered to be a major advantage to achieve both high safety and energy density by such a nail penetrating method.

Furthermore, from the evaluation results of the batteries of Examples 16 to 19 which differ only in the arrangement position of the current collecting lead, a preferable position for arranging the current collecting lead is clear. That is, the arrangement position of the electrode lead provided on the inner peripheral side electrode has no difference in safety, even if it is the end portion on the inner peripheral side or the end portion on the outer peripheral side. On the other hand, the position of the electrode lead arranged on the outer peripheral side electrode differs depending on whether it is the end portion on the inner peripheral side or the end portion on the outer peripheral side, and the safety is improved in the case where the electrode lead is arranged at the end portion on the inner peripheral side, as compared with the case where the electrode lead is arranged at the end portion on the outer peripheral side.

The above difference in safety is presumed to be due to the following reasons. The heat generation amount of the short-circuit portion is the largest on the outer peripheral side of the battery, and the heat generation amount is determined only by the resistance of the short-circuit portion and the short-circuit current. On the other hand, heat generated by the current flowing in the current collector foil and the leads in the longitudinal direction is also present, and is considered to be added to the heat generated by the short-circuit portion. At this time, if the current collecting lead of the outer peripheral side electrode is arranged at the end portion on the outer peripheral side, the heat generated due to the current flowing from the current collecting lead overlaps with the short-circuit portion that generates a large amount of heat, and thus it is considered that the safety is reduced.

As described above, the electrodes are in a divided structure and the current collecting leads of the divided electrodes are electrically connected to each other outside the exterior material, so that a battery in which the resistance is low, the safety at the time of short circuit is high, and the energy density is high can be obtained.

Although the embodiments and examples of the present disclosure have been specifically described above, the present disclosure is not limited to the above-described embodiments and examples, and various variations based on the technical idea of the present disclosure are possible.

For example, the configurations, methods, steps, shapes, materials, numerical values, and the like described in the above-described embodiments and their variations, and examples are merely examples, and different configurations, methods, steps, shapes, materials, numerical values, and the like may be used, if necessary. In addition, the chemical formulas of the compounds, and the like are typical ones, and are not limited to the described valences and the like as long as they are the common names of the same compounds.

In addition, the configurations, methods, steps, shapes, materials, numerical values, and the like of the above-described embodiments and their variations, and examples can be combined with each other without departing from the spirit of the present disclosure.

In addition, the present disclosure is further described below in detail according to an embodiment.

(1)

A battery, including:

an electrode body having a positive electrode and a negative electrode, in which the positive electrode and the negative electrode are wound; and an exterior material that accommodates the electrode body, in which at least one of the positive electrode and the negative electrode is divided into two or more electrodes adjacent in a winding direction, the two or more of electrodes each have a current collecting lead, and the current collecting leads are electrically connected to each other outside the exterior material.

(2)

The battery according to (1), in which when at least one of the positive electrode and the negative electrode is divided into the two electrodes adjacent in the winding direction, the electrode located on an outer peripheral side of the two electrodes has the current collecting lead at an end portion on an inner peripheral side.

(3)

The battery according to (1), in which the electrode body further has a separator provided between the positive electrode and the negative electrode, the positive electrode and the negative electrode have a positive electrode current collector exposed portion and a negative electrode current collector exposed portion, respectively, the positive electrode current collector exposed portion and the negative electrode current collector exposed portion configure at least one facing portion facing each other with the separator interposed therebetween.

(4)

The battery according to (3), in which the facing portion is provided on at least one of an inner peripheral side and an outer peripheral side of at least one of the divided electrodes.

(5)

The battery according to (3), in which the facing portion is provided on an outer peripheral side of at least one of the divided electrodes.

(6)

The battery according to (3), in which the facing portion is provided on an outer peripheral side of an outermost electrode of the divided electrodes.

(7)

The battery according to (3), in which e facing portion is provided on an outer peripheral side of all the divided electrodes.

(8)

The battery according to (3), in which when at least one of the positive electrode and the negative electrode is divided into a first electrode and a second electrode that are adjacent in the winding direction, the facing portion is provided on at least one of an inner peripheral side and an outer peripheral side of at least one of the first electrode and the second electrode.

(9)

The battery according to (3), in which when at least one of the positive electrode and the negative electrode is divided into a first electrode and a second electrode that are adjacent in the winding direction, the facing portion is provided on an outer peripheral side of at least one of the first electrode and the second electrode.

(10)

The battery according to (3), in which when at least one of the positive electrode and the negative electrode is divided into a first electrode and a second electrode that are adjacent in the winding direction, the facing portion is provided on an outer peripheral side of either that is located on an outer peripheral side of the first electrode and the second electrode.

(11)

The battery according to (3), in which when at least one of the positive electrode and the negative electrode is divided into a first electrode and a second electrode that are adjacent in the winding direction, the facing portion is provided on an outer peripheral side of the first electrode and the second electrode.

(12)

The battery according to any of (1) to (11), in which the electrode body has a flat shape, the current collecting leads that each of the two or more electrodes has are overlapped in a thickness direction of the electrode body.

(13)

The battery according to (12), in which the current collecting lead is sandwiched between peripheral portions of the exterior material such that one end of the current collecting lead is exposed to an outside, the battery further including a sealant provided between the exterior material and the current collecting lead and between the overlapped current collecting leads.

(14)

The battery according to any of (1) to (13), in which the exterior material is a laminate film.

(15)

A battery pack, including: p the battery according to any of (1) to (14); and a control unit that controls charging and discharging of the battery.

(16)

An electronic apparatus, including:

the battery according to any of (1) to (14), in which the electronic apparatus receives power supply from the battery.

(17)

An electric vehicle including:

the battery according to any of (1) to (14);

a converter that receives power supply from the battery and converts the power into driving force of a vehicle; and a controller that performs information processing on vehicle control based on information on the battery.

(18)

A power storage device, including:

the battery according to any of (1) to (14), in which the power storage device supplies power to an electronic apparatus connected to the battery.

(19)

The power storage device according to (18), including:

a power information controller that transmits and receives signals to and from other devices via a network, in which charge and discharge control of the battery is performed based on the information received by the power information controller.

(20)

A power system, including:

the battery according to any of (1) to (14), in which the power system receives power supply from the battery.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A battery, comprising:

an electrode body having a positive electrode and a negative electrode, wherein the positive electrode and the negative electrode are wound; and an exterior material configured to accommodate the electrode body, wherein at least one of the positive electrode and the negative electrode is divided into two or more electrodes adjacent in a winding direction, and the two or more of electrodes each have a current collecting lead, and the current collecting leads are electrically connected to each other at a position outside the exterior material, wherein the electrode body further includes a separator provided between the positive electrode and the negative electrode, the positive electrode and the negative electrode have a positive electrode current collector exposed portion and a negative electrode current collector exposed portion, respectively, the positive electrode current collector exposed portion and the negative electrode current collector exposed portion have at least one facing portion facing each other with the separator interposed therebetween.

2. The battery according to claim 1, wherein in a case that at least one of the positive electrode and the negative electrode is divided into two electrodes adjacent in the winding direction, the electrode located on an outer peripheral side of the two electrodes has a first current collecting lead at an end portion on an inner peripheral side.

3. The battery according to claim 1, wherein the facing portion is provided on at least one of an inner peripheral side and an outer peripheral side of at least one of the divided electrodes.

4. The battery according to claim 1, wherein the facing portion is provided on an outer peripheral side of at least one of the divided electrodes.

5. The battery according to claim 1, wherein the facing portion is provided on an outer peripheral side of an outermost electrode of the divided electrodes.

6. The battery according to claim 1, wherein the facing portion is provided on an outer peripheral side of each of the divided electrodes.

7. The battery according to claim 1, wherein in a case that at least one of the positive electrode and the negative electrode is divided into a first electrode and a second electrode that are adjacent in the winding direction, the facing portion is provided on at least one of an inner peripheral side and an outer peripheral side of at least one of the first electrode and the second electrode.

8. The battery according to claim 1, wherein in a case that at least one of the positive electrode and the negative electrode is divided into a first electrode and a second electrode that are adjacent in the winding direction, the facing portion is provided on an outer peripheral side of at least one of the first electrode and the second electrode.

9. The battery according to claim 1, wherein in a case that at least one of the positive electrode and the negative electrode is divided into a first electrode and a second electrode that are adjacent in the winding direction, the facing portion is provided on an outer peripheral side of each of the first electrode and the second electrode.

10. The battery according to claim 1, wherein in a case that at least one of the positive electrode and the negative electrode is divided into a first electrode and a second electrode that are adjacent in the winding direction, the facing portion is provided on an outer peripheral side of the first electrode and the second electrode.

11. The battery according to claim 1, wherein the electrode body has a flat shape,
the current collecting leads are overlapped in a thickness direction of the electrode body.

12. The battery according to claim 11, wherein the current collecting leads are sandwiched between peripheral portions of the exterior material such that one end of the current collecting leads is exposed to an outside, and
wherein the battery further includes a sealant provided between the exterior material and the current collecting leads and between the overlapped current collecting leads.

13. The battery according to claim 1, wherein the exterior material includes a laminate film.

14. A battery pack, comprising:
the battery according to claim 1; and
a controller configured to control charging and discharging of the battery.

15. An electronic apparatus, comprising:
the battery according to claim 1, wherein the electronic apparatus is configured to receive power supply from the battery.

16. An electric vehicle comprising:
the battery according to claim 1;
a converter configured to receive power supply from the battery and convert the power into driving force of the electric vehicle; and
a controller configured to perform information processing on vehicle control based on information on the battery.

17. A power storage device, comprising:
the battery according to claim 1, wherein
the power storage device is configured to supply power to an electronic apparatus connected to the battery.

18. The power storage device according to claim 17, comprising:
a power information controller configured to transmit and receive signals to and from other devices via a network, wherein
charge and discharge control of the battery is performed based on the information received by the power information controller.

19. A power system, comprising:
the battery according to claim 1, wherein
the power system is configured to receive power supply from the battery.

* * * * *